(12) United States Patent
Loukusa et al.

(10) Patent No.: US 11,691,164 B2
(45) Date of Patent: Jul. 4, 2023

(54) MIX MANIFOLD AND VALVE SEAL ASSEMBLY

(71) Applicant: Graco Minnesota Inc., Minneapolis, MN (US)

(72) Inventors: David D. Loukusa, Maple Grove, MN (US); Dennis J. Van Keulen, Rogers, MN (US); Jeremy Peter Jurmu, Big Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/057,461

(22) PCT Filed: May 22, 2019

(86) PCT No.: PCT/US2019/033480
§ 371 (c)(1),
(2) Date: Nov. 20, 2020

(87) PCT Pub. No.: WO2019/226747
PCT Pub. Date: Nov. 28, 2019

(65) Prior Publication Data
US 2021/0138494 A1  May 13, 2021

Related U.S. Application Data

(60) Provisional application No. 62/675,430, filed on May 23, 2018.

(51) Int. Cl.
*B05B 7/04* (2006.01)
*B05B 15/55* (2018.01)
(Continued)

(52) U.S. Cl.
CPC .......... *B05B 7/0408* (2013.01); *B05B 1/3026* (2013.01); *B05B 12/002* (2013.01);
(Continued)

(58) Field of Classification Search
CPC ..... B05B 7/0408; B05B 15/55; B05B 1/3026; B05B 12/002; F16K 5/025; F16K 11/205
(Continued)

(56) References Cited

U.S. PATENT DOCUMENTS 1,329,881 A   2/1920   Bloom
2,525,831 A   10/1950  Scherer
(Continued)

FOREIGN PATENT DOCUMENTS

CN   101272865 A   9/2008
CN   204459237 U   7/2015
(Continued)

OTHER PUBLICATIONS

International Search Report and Written Opinion for PCT Application No. PCT/2019/033480, dated Jul. 11, 2019, pp. 16.
(Continued)

*Primary Examiner* — Chee-Chong Lee
(74) *Attorney, Agent, or Firm* — Kinney & Lange, P.A.

(57) ABSTRACT

A mix manifold (16) includes a plurality of valves to control the flow of material therethrough. First and second valves (36a, 36b) are linked for simultaneous actuation. The first and second valves each include valve members (56a, 56b) disposed within and rotatable relative to seal bodies (58a, 58b). The valve members seal against the seal bodies and the seal bodies seal against the manifold. A solvent valve (36c) also includes a valve member (56c) in a seal body (58c). The first and second valves are configured to open only when the solvent valve is closed. The solvent valve is configured to open only when the first and second valves are closed. The solvent valve can rotate between a plurality of positions to control the flow of solvent to flowpaths downstream of the first and second valves.

19 Claims, 9 Drawing Sheets

(51) Int. Cl.
  *B05B 1/30* (2006.01)
  *B05B 12/00* (2018.01)
  *F16K 5/02* (2006.01)
  *F16K 11/20* (2006.01)
(52) U.S. Cl.
  CPC .............. *B05B 15/55* (2018.02); *F16K 5/025* (2013.01); *F16K 11/205* (2013.01)
(58) Field of Classification Search
  USPC ........................................................ 239/306
  See application file for complete search history.

(56) References Cited

U.S. PATENT DOCUMENTS

| | | | |
|---|---|---|---|
| 2,713,987 A | 7/1955 | Schenck | |
| 3,135,279 A | 6/1964 | Dunklee, Jr. | |
| 3,224,642 A | 12/1965 | Martelaere et al. | |
| 3,370,335 A | 2/1968 | Freed | |
| 3,504,855 A * | 4/1970 | Volker | B05B 15/55 |
| | | | 239/125 |
| 3,690,557 A * | 9/1972 | Higgins | B29B 7/7438 |
| | | | 239/416.1 |
| 3,784,110 A * | 1/1974 | Brooks | B05B 12/0026 |
| | | | 239/304 |
| 3,790,030 A * | 2/1974 | Ives | B05B 7/1209 |
| | | | 138/40 |
| 3,837,575 A * | 9/1974 | Lehnert | B05B 7/0408 |
| | | | 239/527 |
| 3,906,997 A | 9/1975 | Scaglione | |
| 4,117,551 A | 9/1978 | Brooks et al. | |
| 4,193,546 A | 3/1980 | Goelz et al. | |
| 4,219,046 A | 8/1980 | West et al. | |
| 4,265,858 A | 5/1981 | Crum et al. | |
| 4,475,712 A | 10/1984 | Dejager | |
| 4,614,330 A | 9/1986 | Kalsi et al. | |
| 4,830,055 A | 5/1989 | Kolibas | |
| 5,234,194 A | 8/1993 | Smith | |
| 5,467,899 A | 11/1995 | Miller | |
| 6,227,228 B1 | 5/2001 | Fullenbach | |
| 6,896,399 B2 | 5/2005 | Nomura et al. | |
| 8,652,581 B2 | 2/2014 | Merchant | |
| 2011/0042599 A1* | 2/2011 | Arai | F16K 1/2266 |
| | | | 251/251 |
| 2018/0031135 A1 | 2/2018 | Gur | |

FOREIGN PATENT DOCUMENTS

| | | |
|---|---|---|
| CN | 105612004 A | 5/2016 |
| CN | 107335556 A | 11/2017 |
| DE | 21905 C | 4/1883 |
| DE | 1967061 A1 | 11/1976 |
| DE | 3821446 A1 | 1/1989 |
| GB | 1388422 A | 3/1975 |
| GB | 2124336 A | 2/1984 |
| JP | H01210060 A | 8/1989 |
| TW | 200408457 A | 6/2004 |
| WO | 2016061857 A1 | 4/2016 |

OTHER PUBLICATIONS

First Chinese Office Action for CN Application No. 201980034746.5, dated Jan. 26, 2022, pp. 17.
Notification to Grant for CN Application No. 201980034746.5, dated Jul. 20, 2022, pp. 6.
International Preliminary Report on Patentability for PCT Application No. PCT/US2019/033480, dated Dec. 3, 2020, pp. 10.
Communication Pursuant to Article 94(3) EPC for EP Application No. 19730024.7, dated Sep. 27, 2021, pp. 3.
Partial European Search Report for EP Application No. 22202985.2, dated Dec. 7, 2022, pp. 13.
First Japanese Office Action for JP Application No. 2020-565285, dated Apr. 19, 2023, pp. 7.
First Taiwan Office Action for TW Application No. 108117888, dated May 17, 2023, pp. 14.

\* cited by examiner

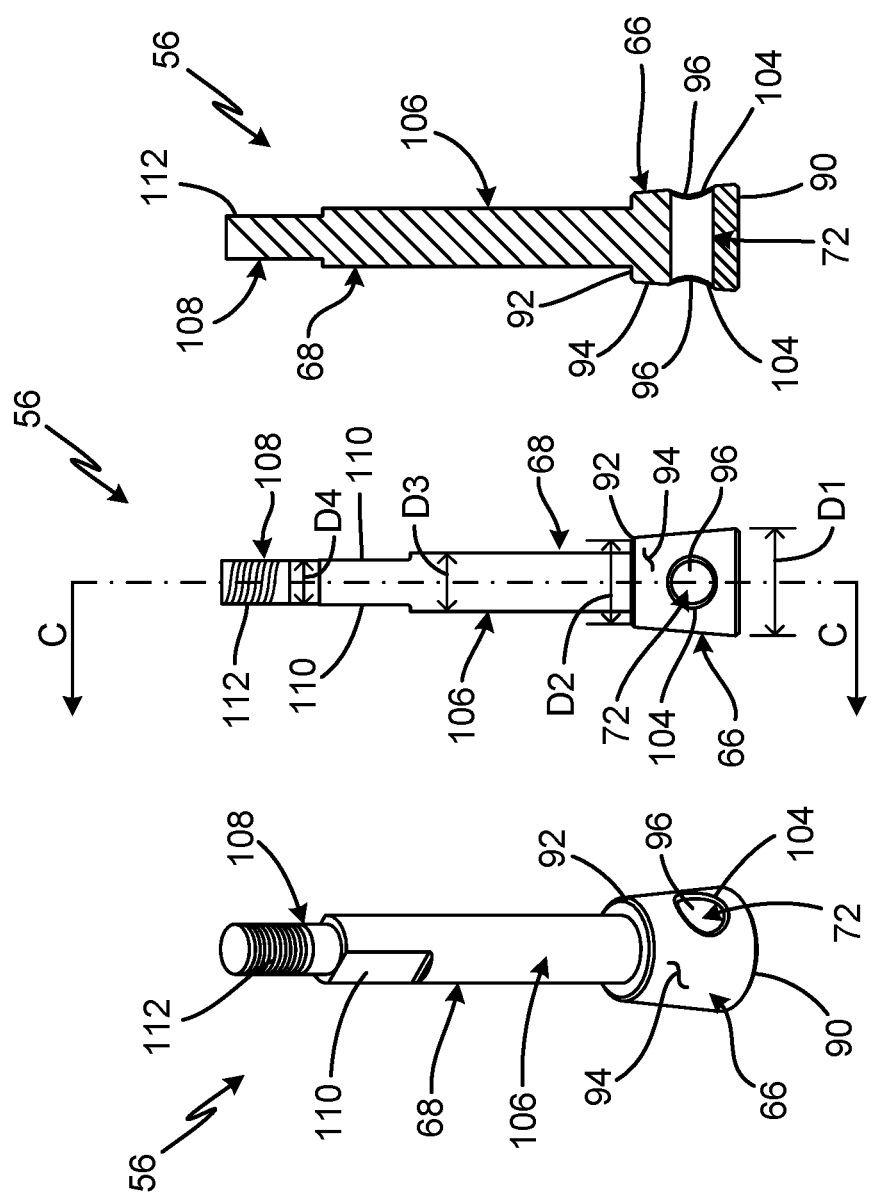

MIX MANIFOLD AND VALVE SEAL ASSEMBLY

CROSS-REFERENCE TO RELATED APPLICATION(S)

This application claims the benefit of U.S. Provisional Application No. 62/675,430, filed May 23, 2018, and entitled "VALVE SEAL," the disclosure of which is hereby incorporated by reference in its entirety.

BACKGROUND

This disclosure relates generally to fluid control. More particularly, this disclosure relates to valves and manifolds for plural component dispensing.

Mix manifolds are utilized in plural component dispensing systems to mix the multiple components that form the plural component material. Valves are utilized to control the flow of each component material. Typically, the valves must be capable of disassembly in order for the valve to be serviced and maintained (e.g., rebuilt after a certain service life), referred to as a rebuildable valve. The mix manifolds include check valves to prevent undesired backflow of either of the component materials, which can cause undesired mixing of the materials, thereby leading to curing within the mix manifold.

One potential drawback with rebuidable valves can be the difficulty with maintaining a sealing surface. Metal-to-metal sealing surfaces rarely provide sufficient sealing, and as such, other materials than metal must be used.

Materials such as most polytetrafluoroethylenes (hereafter "PTFE") (especially virgin and glass PTFE) are too soft to act as a sealing surface if the sealing surface includes an orifice that rotates against a corresponding orifice in the valve housing. The orifice made through the PTFE material is gouged/scalloped when the valve stem is rotated, thus eroding the sealing capability of the valve.

Another potential issue with prior rebuidable valves is the friction created by compressing the sealing surfaces, which can require an excessive amount of torque to open and close the valve. In many cases, the torque required to open or close the valve may exceed the ability to open or close by hand (and instead require the use of a tool, such as a wrench).

SUMMARY

According to one aspect of the disclosure, a mix manifold includes a valve housing having a first fluid inlet, a second fluid inlet, a third fluid inlet, and a fluid outlet; a first fluid flowpath extending between the first fluid inlet and the fluid outlet; a second fluid flowpath extending between the second fluid inlet and the fluid outlet; a solvent flowpath extending from the third fluid inlet, wherein the solvent flowpath includes a first branch extending to the first fluid flowpath and a second branch extending to the second fluid flowpath; a first check valve disposed in the first fluid flowpath at a location downstream of an intersection between the first branch and the first fluid flowpath; a second check valve disposed in the second fluid flowpath at a location downstream of an intersection between the second branch and the second fluid flowpath; a first valve disposed in the first fluid flowpath and configured to control fluid flow between the first fluid inlet and the fluid outlet; a second valve disposed in the second fluid flowpath and configured to control fluid flow between the second fluid inlet and the fluid outlet; and a third valve disposed in the solvent flowpath and configured to control fluid flow from the third fluid inlet to the first branch and the second branch.

According to another aspect of the disclosure, a valve seal includes a seal body having a first body end, a second body end, and a body bore extending between the first body end and the second body end and a valve member at least partially disposed in the seal body. The valve member includes a head configured to be disposed in the body bore and having a first head end, a second head end, and an exterior surface extending between the first head end and the second head end; a stem extending from the second head end and configured to project from the second body end out of the body bore; and a fluid passage extending through the head, the fluid passage including a first orifice and a second orifice, the second orifice extending through the exterior surface. The exterior surface is tapered between the first head end and the second head end and the body bore is tapered between the first body end and the second body end.

According to yet another aspect of the disclosure, a method includes actuating a first handle to an open position thereby rotating a first valve member of a first valve to a first valve open position and a second valve member of a second valve to a second valve open position; flowing, with the first handle in the first position, a resin through a first flowpath within which the first valve member is disposed and a catalyst through a second flowpath within which the second valve member is disposed, wherein the resin and the catalyst combine in a mix manifold downstream of each of the first valve member and the second valve member; actuating the first handle to a closed position thereby rotating the first valve member to a first valve closed position and the second valve member to a second valve closed position; actuating, with the first handle in the closed position, a second handle from a neutral position to one of a first flush position and a second flush position, thereby rotating a third valve member of a third valve from a neutral valve position to one of a first valve flush position and a second valve flush position; flowing, with the second handle in the first flush position, solvent through the third valve member and to a portion of the first flowpath downstream of the first valve member; and flowing, with the second handle in the second flush position, solvent through the third valve member and to a portion of the second flowpath downstream of the second valve member.

BRIEF DESCRIPTION OF THE DRAWINGS

FIG. 8A is an isometric view of a valve member.

FIG. 8B is a side elevational view of a valve member.

FIG. 8C is a cross-sectional view of the valve member shown in FIG. 8A taken along line C-C in FIG. 8B.

DETAILED DESCRIPTION

The apparatuses, systems, and methods disclosed herein provide solutions to improve the sealing capability of the valve while preventing gouging of the valve orifice and/or minimizing the friction between the valve sealing surface and the valve housing sealing surface, which impacts the turning resistance of the valve.

Figure 1:
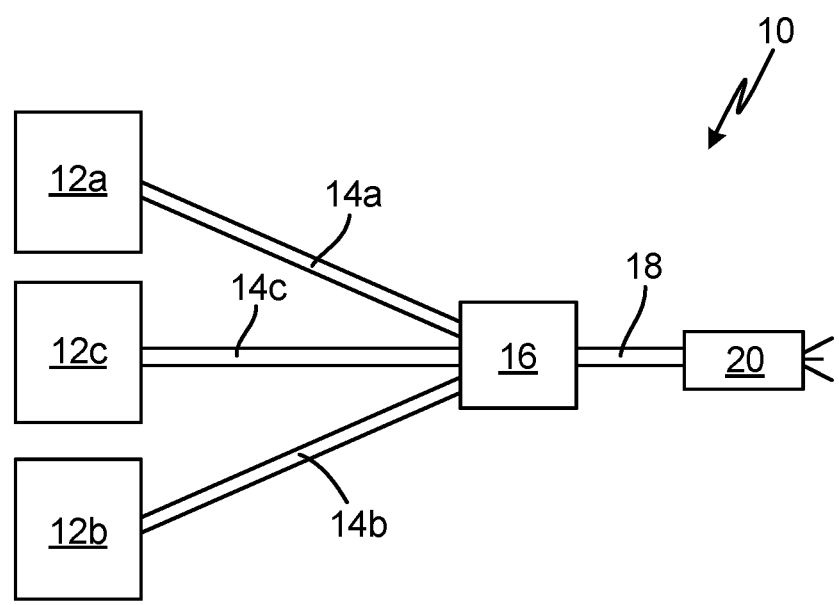
FIG. 1 is a schematic block diagram of a fluid dispensing system.

FIG. 1 is a schematic block diagram of plural component dispensing system 10. System 10 includes reservoirs 12a-12c; supply lines 14a-14c; mix manifold 16, spray hose 18, and dispenser 20. System 10 facilitates mixing and spraying of plural component materials.

Reservoir 12a stores a first component of the multiple component material. For example, reservoir 12a can store a resin. Reservoir 12b stores a second component of the multiple component material. For example, reservoir 12b can store a catalyst. Reservoir 12c stores solvent for flushing system 10 when the user changes the component materials, such as during a color change.

Supply line 14a extends between reservoir 12a and mix manifold 16. Supply line 14a provides the first component material to mix manifold 16 from reservoir 12a. Supply line 14b extends between reservoir 12b and mix manifold 16. Supply line 14b provides the second component material to mix manifold 16 from reservoir 12b. The first component material and the second component material mix within mix manifold 16 and are provided to spray hose 18 from mix manifold 16. The user can dispense the plural component material via dispenser 20, which can be a spray gun, for example.

After spraying the plural component material, system 10 is flushed with solvent. Supply line 14c extends between reservoir 12c and mix manifold 16. Supply line 14c provides the solvent to mix manifold 16 from reservoir 12c. During flushing, the solvent flows to mix manifold 16 and downstream through spray hose 18 and is ejected from dispenser 20. Mix manifold 16 is configured such that the solvent flows at least through those portions of mix manifold 16 within which the combined plural component material flowed, to prevent the plural component material from curing in mix manifold 16.

Mix manifold 16 facilitates significantly less waste within system 10. When a color change is made, only the length of spray hose 18 between mix manifold 16 and dispenser 20 needs to be flushed. Supply lines 14a, 14b are not flushed with solvent as no mixed material flowed within supply lines 14a, 14b, thereby significantly reducing the volume of solvent required with each flush providing both environmental benefits and monetary savings.

Figure 2A:
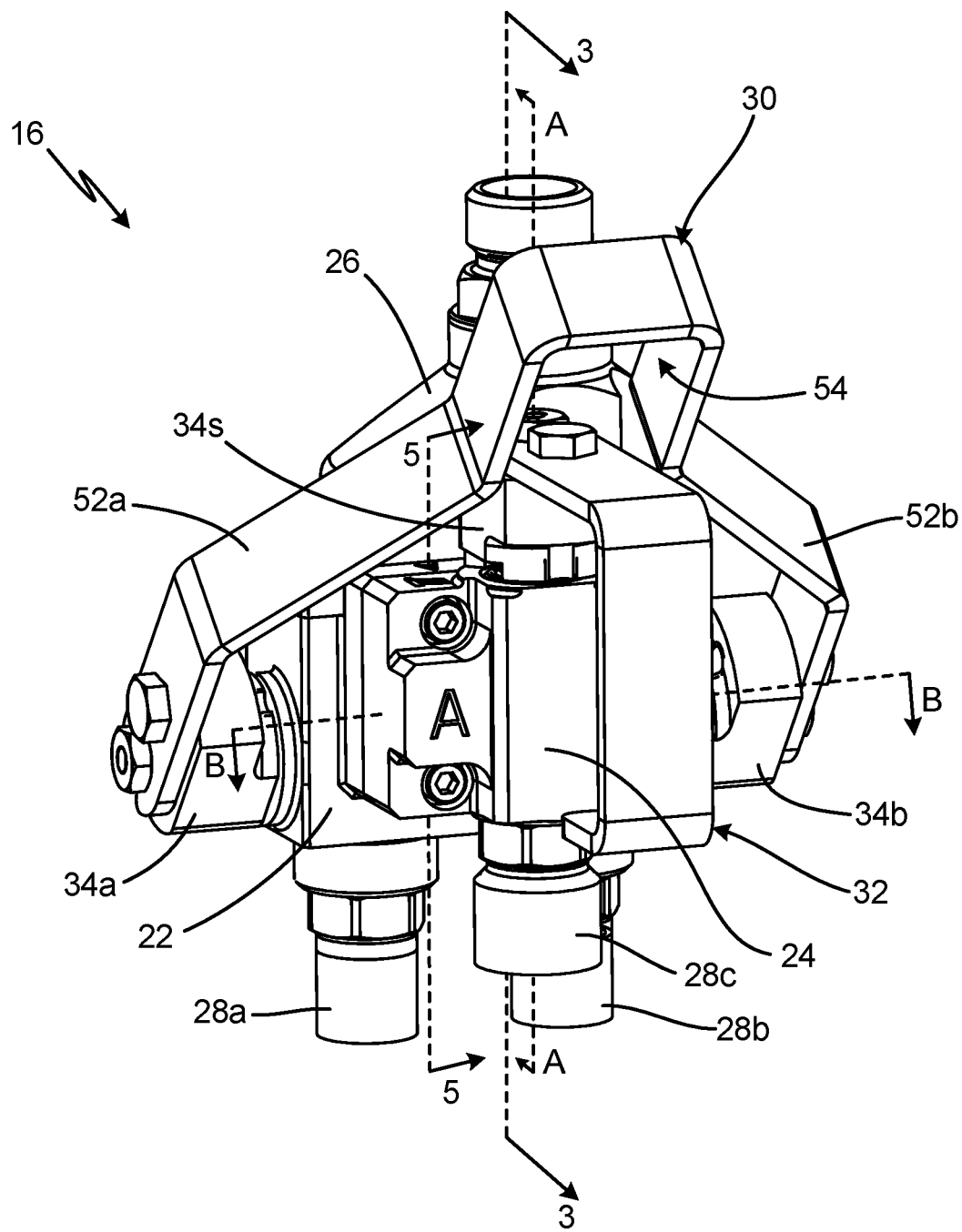
FIG. 2A is an isometric view of a mix manifold.
Figure 2B:
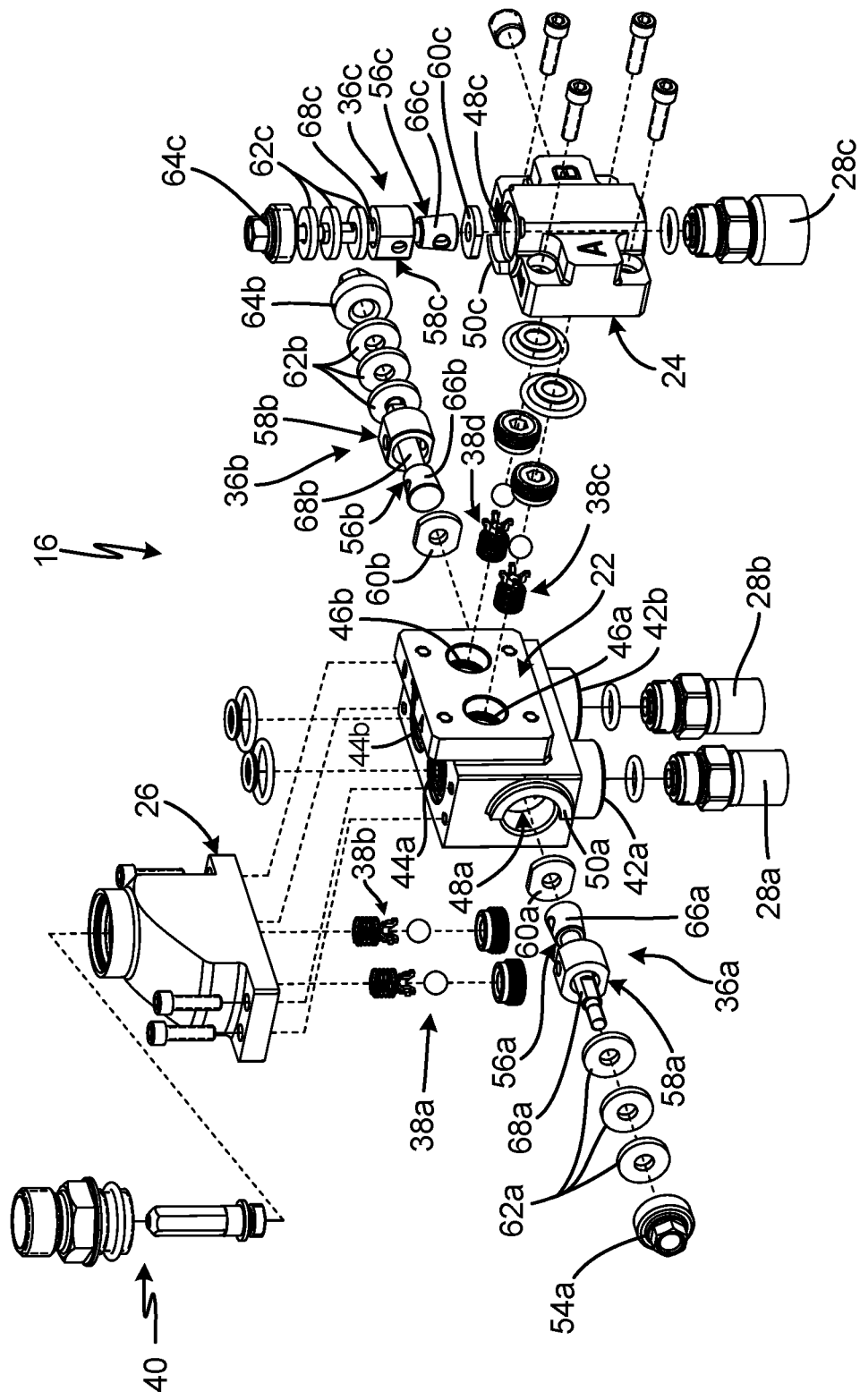
FIG. 2B is an exploded view of the mix manifold shown in FIG. 2A.

FIG. 2A is an isometric view of mix manifold 16. FIG. 2B is an exploded view of mix manifold 16 shown in FIG. 2A with primary handle 30 and solvent handle 32 removed. FIGS. 2A and 2B will be discussed together. Mix manifold 16 includes main housing 22, solvent housing 24, mix housing 26, inlet connectors 28a, 28b, 28c; primary handle 30; solvent handle 32; mounting blocks 34a, 34b, 34c; valves 36a, 36b, 36c; check valves 38a-38d; and mixer 40. Main housing 22 includes material inlets 42a, 42b; materials outlets 44a, 44b; solvent inlets 46a, 46b; valve bores 48a, 48b; and limit flange 50a. Solvent housing 24 includes valve bore 48c and limit flange 50c. Primary handle 30 includes legs 52a, 52b and clevis 54. Valves 36a, 36b include, respectively, valve members 56a, 56b; seal bodies 58a, 58b; inner spacers 60a, 60b; outer spacers 62a, 62b; and packing nuts 64a, 64b. Valve members 56a, 56b includes valve heads 66a, 66b and valve stems 68a, 68b. Valve 36c includes valve member 56c, seal body 58c, inner spacer 60c, outer spacer 62c, and packing nut 64c. Valve member 56c also includes valve head 66c and valve stem 68c.

Solvent housing 24 and mix housing 26 are mounted to main housing 22. Inlet connectors 28a, 28b are mounted to main housing 22. Inlet connectors 28a, 28b receive hoses, such as supply lines 14a, 14b (FIG. 1), extending from reservoirs, such as reservoirs 12a, 12b (FIG. 1), to supply component materials to main housing 22. Valves 36a, 36b control the flow of the component material downstream through main housing 22 to materials outlets 44a, 44b, which are disposed at the interface of main housing 22 and mix housing 26. Check valves 38a, 38b are disposed at the interface between main housing 22 and mix housing 26. Check valves 38a, 38b are configured to control material flow into mix housing 26 from main housing 22. Mix housing 26 brings the component materials together at mixer 40, which facilitates mixing, and the plural component material flows downstream out of mix housing 26 for application.

Valves 36a, 36b control component material flow through mix manifold 22. In some examples, valves 36a, 36b are identical. Seal bodies 58a, 58b are disposed valve bores 48a, 48b in the flowpaths between material inlets 42a, 42b and materials outlets 44a, 44b, respectively. Valve heads 66a, 66b are disposed within seal bodies 58a, 58b in the flowpaths between material inlets 42a, 42b and materials outlets 44a, 44b, respectively. Inner spacers 60a, 60b are disposed within valve bores 48a, 48b of mix manifold 16 between the ends of valve heads 66a, 66b and mix manifold 16. Valve stems 68a, 68b extend out of seal bodies 58a, 58b, through outer spacers 62a, 62b, and out of valve bores 48a, 48b through packing nuts 64a, 64b. Packing nuts 64a, 64b are mounted in valve bores 48a, 48b and are configured to compress inner spacers 60a, 60b, outer spacers 62a, 62b, and seal bodies 58a, 58b together within valve bores 48a, 48b. Packing nuts 64a, 64b can be mounted within valve bores 48a, 48b in any desired manner, such as by interfaced threading. In some examples, packing nuts 64a, 64b can be torqued to about 11.3 Newton meters (Nm) (about 100 inch pounds (in-lbf)). Valve stems 68a, 68b are respectively connected to mounting blocks 34a, 34b which are connected to primary handle 30.

Valve members 56a, 56b are connected to primary handle 30 to rotate between respective open states and closed states. In the example shown, each valve member 56a, 56b is disposed on component axis A-A. In some examples, valve members 56a, 56b are coaxial, though it is understood that valve members 56a, 56b can be disposed such that valve members 56a, 56b are not coaxial. In some examples, valve members 56a, 56b are disposed on parallel axes. Primary handle 30 is attached to each of valve members 56a, 56b to simultaneously rotate valve members 56a, 56b between the open and closed states. In the open state, valve members 56a, 56b are positioned to provide flowpaths between material inlets 42a, 42b and materials outlets 44a, 44b. When rotated to the closed states, valve members 56a, 56b prevent downstream flow such that the component materials cannot flow downstream within main housing 22 past valve members 56a, 56b. While primary handle 30 is described as a single part configured to simultaneously rotate valve members 56a, 56b, it is understood that primary handle 30 can be split into two separate handles to allow individual control of valve members 56a, 56b. For example, primary handle 30 can be split into two subhandles at clevis 54. In other examples, the two halves of primary handle 30 can be joined by a flexible material or component to ensure simultaneous rotation between fully closed and fully opened, while allowing feathering between the positions of valve members 56a, 56b.

Solvent housing 24 is mounted to main housing 22. Inlet connector 28c is connected to solvent housing 24 and is configured to receive a hose, such as supply line 14c (FIG. 1), from a reservoir, such as reservoir 12c (FIG. 1), to supply solvent to solvent housing 24. Valve 36c is configured to control the flow of solvent downstream through solvent housing 24 between inlet connector 28c and main housing 22. A solvent flowpath extends through solvent housing 24 and into main housing 22 to provide solvent to the flowpaths extending through main housing 22.

Check valves 38c, 38d are disposed at the interface of main housing 22 and solvent housing 24. Check valves 38c, 38d are configured to prevent the respective component materials from flowing into solvent housing 24. In addition, check valves 38c, 38d prevent undesired backflow of solvent into solvent housing 24 during flushing.

Valve 36c is configured to control the material flows between material inlet 42c and solvent inlets 46a, 46b. Seal body 58c is disposed in valve bore 48c in the flowpath between inlet connector 28c and the outlets in solvent housing 24 configured to align with solvent inlets 46a, 46b. Valve head 66c is disposed within seal body 58c. Valve head 66c is configured to direct the solvent flow from material inlet 42c to one or the other of solvent inlets 46a, 46b or to prevent the solvent from flowing to either solvent inlet 46a, 46b.

Inner spacer 60c is disposed within valve bore 48c of solvent housing 24 between the end of valve head 66c and a portion of solvent housing 24. As discussed in more detail below, inner spacer 60c includes a central opening that allows solvent to enter a passages extending through valve head 66c. Valve stem 68c extends out of seal body 58c, through outer spacer 62c, and out of valve bore 48c through packing nut 64c. Inner spacer 60c and outer spacer 62c provide fluid seals. Packing nut 64c is mounted in valve bore 48c and is configured to compress outer spacer 62c, inner spacer 60c, and seal body 58 together to facilitate the seal within valve bore 48c. Packing nut 64c can be mounted within valve bore 48c in any desired manner, such as by interfaced threading between packing nut 64c and solvent housing 24. In some examples, packing nut 64c can be torqued to about 11.3 Nm (about 100 in-lbf). Valve stem 68c is connected to mounting block 34c, which is connected to solvent handle 32.

As discussed in more detail below, valve 36c is a three-way valve movable between a first flow position, a second flow position, and a shut-off position. Valve member 56c is connected to solvent handle 32 such that solvent handle 32 can rotate valve member 56c between the first flow position, the second flow position, and the shut-off position. In the first flow position, valve 36c directs solvent to main housing 22 at solvent inlet 46a and prevents solvent flow to solvent inlet 46b. In the second flow position, valve 36c directs solvent to main housing 22 at solvent inlet 46b and prevents solvent flow to solvent inlet 46a. In the shut-off position, valve 36c prevents solvent from flowing to either solvent inlet 46a or solvent inlet 46b.

During operation, mix manifold 16 provides a plural component material downstream for application or provides solvent for cleaning the various lines after an application. In some examples, mix manifold 16 is relatively compact and can include mounting hardware. For example, mix manifold 16 can be configured to attach to the user such that mix manifold 16 moves with the user. In one example, mix manifold 16 can include mounting hardware configured to connect to the belt of a user.

To provide the plural component material, primary handle 30 and solvent handle 32 are placed in the positions shown in FIG. 2A. In the position shown in FIG. 2A, valve 36c is in the shut-off position and valves 36a, 36b are in the open state. Solvent handle 32 is disposed within clevis 54 formed by primary handle 30. As such, primary handle 30 prevents solvent handle 32 from rotating, thereby maintaining valve 36c in the shut-off position.

With each of valves 36a, 36b in the open state, the first and second component materials flow downstream through valves 36a, 36b and into mix housing 26 through check valves 38a, 38b. The component materials mix and are delivered downstream for application as the plural component material.

To stop the flow of the component materials, such as at the end of spraying or when making a material change, the user pivots primary handle 30 about component axis A-A from the up position shown in FIG. 2A to a down position. Limit flange 50a projects from main housing 22 and is configured to engage mounting block 34a to limit rotation of mounting block 34a. A similar limit flange (not shown) can project from the other side of main housing 22 to limit rotation of mounting block 34b. The limit flanges thereby limit rotation of valve members 56a, 56b and ensure that valve members 56a, 56b are in the desired position by preventing over or under rotation.

Shifting primary handle 30 to the down position rotates valve members 56a, 56b such that each of valves 36a, 36b are in the closed state. As such, valve members 56a, 56b prevent the component materials from flowing through main housing 22 and to mix housing 26.

Mix manifold 16 is flushed with solvent to prevent undesired curing of the plural component material within mix manifold 16 and within components downstream of mix manifold 16. With primary handle 30 in the down position, solvent handle 32 is free to rotate about solvent axis S-S. Solvent handle 32 can be rotated towards valve 36a, thereby shifting valve 36c into the first flow position where valve 36c directs solvent into the flowpath extending downstream through main housing 22 from valve 36a. Limit flange 50c project from solvent housing 24 and is configured to engage a portion of mounting block 34c to limit rotation of mounting block 34c, and thus limit rotation of solvent handle 32 and valve member 56c.

The solvent flows to and through that flowpath and downstream out of main housing 22 and mix housing 26, thereby flushing that flowpath. The user can then shift solvent handle 32 towards valve 36b, thereby shifting valve 36c into the second flow position where valve 36c directs solvent into the flowpath extending downstream through main housing 22 from valve 36b. The solvent flows through that flowpath and downstream out of main housing 22 and mix housing 26, thereby flushing that flowpath. Solvent handle 32 can then be rotated back to the neutral, shut-off position shown in FIG. 2A, thereby returning valve 36c to the shut-off position such that the flow of solvent is shut off.

With solvent handle 32 rotated towards valve 36a, solvent handle 32 interferes with leg 52a of primary handle 30. With solvent handle 32 rotated towards valve 36b, solvent handle 32 interferes with leg 52b of primary handle 30. Solvent handle 32 interferes with legs 52a, 52b to prevent actuation of primary handle 30 from the down position to the up position during flushing. As such, the user is prevented from shifting either of valves 36*a*, 36*b* to the open state when valve 36*c* is in either the first flow position or the second flow position. Mix manifold 16 thereby prevents any solvent flow when the component materials are flowing through mix manifold 16, and further prevents any component flow when the solvent is flushing mix manifold 16.

Valves 36*a*, 36*b*, 36*c* can be substantially identical, thereby reducing the user's parts inventory. Each of seal bodies 58*a*-58*c*, inner seals 60*a*-60*c*, and outer seals 62*a*-62*c* can be identical. Valve members 56*a* and 56*b* can be identical, while valve member 56*c* can vary only in the orientation of the passages through valve head 66*c*.

Mix manifold 16 provides significant advantages. Linking valve members 56*a*, 56*b* via primary handle 30 ensures that both valves 36*a*, 36*b* are in the same state (e.g., the open state or the closed state). In addition, rotating valve members 56*a*, 56*b* between the respective states reduces wear on seal bodies 58*a*, 58*b* and valve members 56*a*, 56*b*. In addition, primary handle 30 prevents the user from initiating any solvent flow when valves 36*a*, 36*b* are open, thereby preventing undesired contamination. In addition, solvent handle 32 interferes with primary handle 30 to prevent the user from initiating any component material flow during flushing. Mix manifold 16 thereby ensures that the user does not inadvertently initiate undesired flows. Moreover, mix manifold 16 is relatively compact and facilitates all mixing of the component materials. As such, less solvent is required, thereby saving on material and disposal costs. In addition, valves 36*a*, 36*b*, 36*c* can be quickly disassembled and rebuilt and/or replaced without disassembling the full mix manifold 16. As such, maintenance and downtime are reduced, thereby increasing efficiency. In addition, valves 36*a*, 36*b*, 36*c* can provide effective sealing at fluid pressures of about 10.4 megapascals (MPa) (about 1,500 pounds per square inch (psi)) and higher. In some examples, valves 36*a*, 36*b*, 36*c* can provide effective sealing at fluid pressures up to about 41.5 MPa (about 6,000 psi). In some examples, valves 36*a*, 36*b*, 36*c* have an improved cycle life of 20,000 or more cycles. The improved cycle life is up to 10× greater than existing valves.

Figure 3:
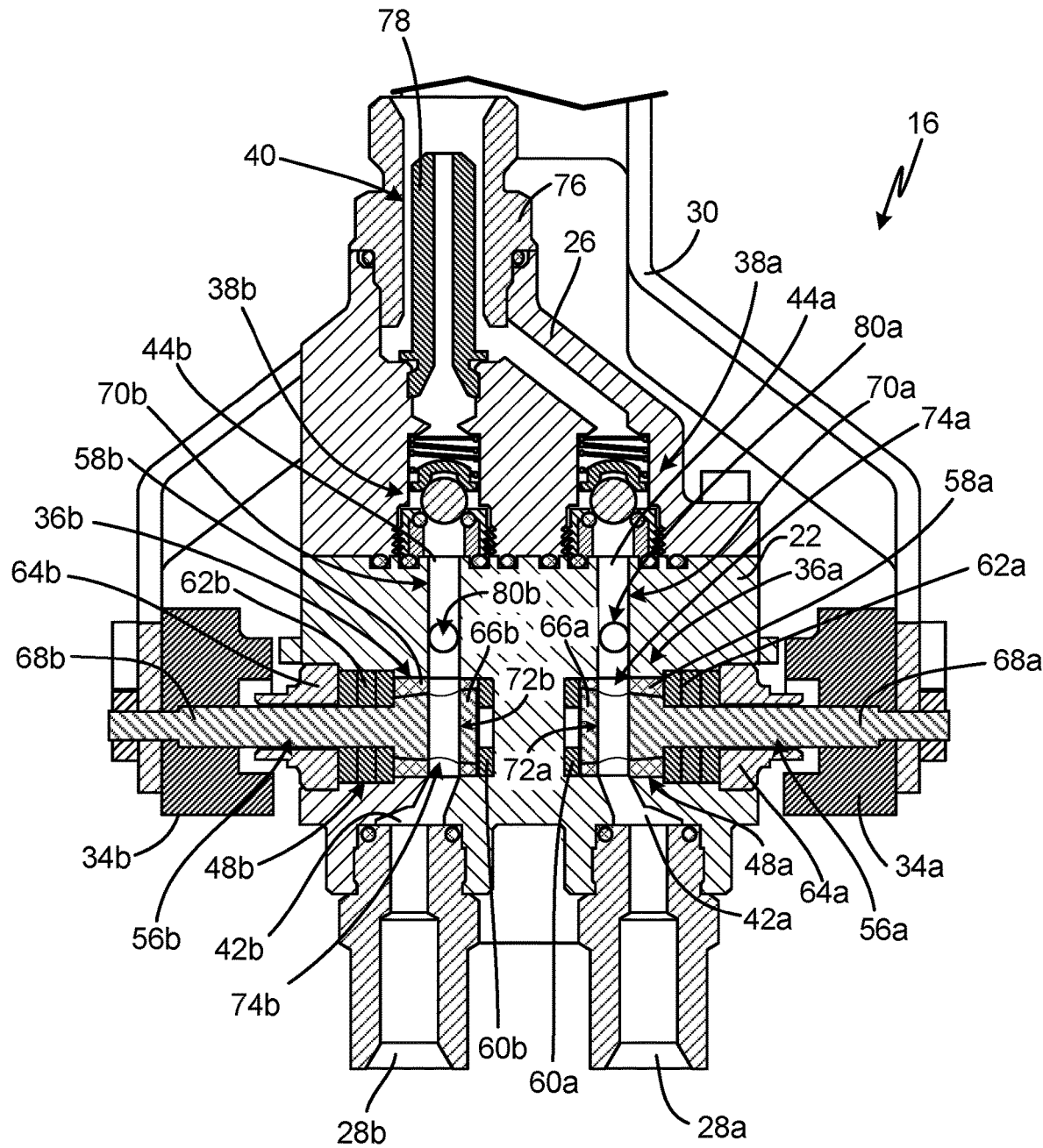
FIG. 3 is a cross-sectional view of the mix manifold shown in FIG. 2A taken along line 3-3 in FIG. 2A.

FIG. 3 is a cross-sectional view of mix manifold 16 taken along line 3-3 in FIG. 2A. Main housing 22; mix housing 26; inlet connectors 28*a*, 28*b*; primary handle 30; mounting blocks 34*a*, 34*b*; valves 36*a*, 36*b*; check valves 38*a*, 38*b*; and mixer 40 of mix manifold 16 are shown. Mix manifold 16 further includes flowpaths 70*a*, 70*b*. Main housing 22 includes material inlets 42*a*, 42*b*; material outlets 44*a*, 44*b*; valve bores 48*a*, 48*b*. Valves 36*a*, 36*b* include, respectively, valve members 56*a*, 56*b*; seal bodies 58*a*, 58*b*; inner spacers 60*a*, 60*b*; outer spacers 62*a*, 62*b*; and packing nuts 64*a*, 64*b*. Valve members 56*a*, 56*b* includes valve heads 66*a*, 66*b* and valve stems 68*a*, 68*b*. Valve heads 66*a*, 66*b* include passages 72*a*, 72*b*. Seal bodies 58*a*, 58*b* include apertures 74*a*, 74*b*. Mixer 40 includes body 76 and stem 78.

Flowpaths 70*a*, 70*b* extend through main housing 22 between material inlets 42*a*, 42*b* and material outlets 44*a*, 44*b*, respectively. Flowpaths 70*a*, 70*b* further extend through mix housing 26 to mixer 40. Inlet connectors 28*a*, 28*b* are mounted to main housing 22 at material inlets 42*a*, 42*b*. Mix housing 26 is mounted to main housing 22 and is configured to receive material from material outlets 44*a*, 44*b*. Flowpath 70*b* provides the material to stem 78 of mixer 40. Flowpath 70*a* provides the material to body 76 of mixer 40. Mixer 40 thereby ensures that the materials are properly mixed by injecting the component material from flowpath 70*b* into the flow of the component material from flowpath 70*a*.

Branch paths 84*a*, 84*b* (shown in FIGS. 4A-4C) extend into flowpaths 70*a*, 70*b*, respectively, at intersections 80*a*, 80*b*. Branch paths 84*a*, 84*b* are configured to provide solvent to flowpaths 70*a*, 70*b*. Intersections 80*a*, 80*b* are disposed between valves 36*a*, 36*b* and check valves 38*a*, 38*b*, such that solvent flows into flowpaths 70*a*, 70*b* downstream of valves 36*a*, 36*b* and upstream of check valves 38*a*, 38*b*.

Check valves 38*a*, 38*b* and valves 36*a*, 36*b* are disposed in flowpaths 70*a*, 70*b*, respectively. In the example shown, check valves 38*a*, 38*b* are disposed at the interface of main housing 22 and mix housing 26. As such, check valves 38*a*, 38*b* prevent backflow of either component material from the portions of flowpaths 70*a*, 70*b* downstream of check valves 38*a*, 38*b*. For example, if there is a pressure drop in the material line supplying the first component material to flowpath 70*a*, then the pressure in flowpath 70*b* can cause the second component material to flow upstream into stem 78. Check valve 38*a* prevents the second component material from flowing upstream into main housing 22, thereby isolating valve 36*a* from any potential contamination. As such, check valve 38*a* limits the portions of flowpath 70*a* that can be exposed to the second component material, thereby necessitating flushing with solvent to prevent undesired curing. Check valve 38*b* provides similar protection to valve 36*b* and flowpath 70*b*. Check valves 38*a*, 38*b* thereby isolate valves 36*a*, 36*b* from undesired contamination and limit the portions of flowpaths 70*a*, 70*b* that require flushing to those portions downstream of check valves 38*a*, 38*b*.

Valve bores 48*a*, 48*b* extend into mix manifold 16 and intersect flowpaths 70*a*, 70*b*, respectively. Valves 36*a*, 36*b* are disposed in valve bores 48*a*, 48*b* and are configured to control flow of the component materials downstream through flowpaths 70*a*, 70*b*. Inner spacers 60*a*, 60*b* are disposed within valve bores 48*a*, 48*b* between the bottom of each valve bore 48*a*, 48*b* and valve members 56*a*, 56*b*. Seal bodies 58*a*, 58*b* are disposed in valve bores 48*a*, 48*b*. Seal bodies 58*a*, 58*b* are configured to seal against main housing 22. In some examples, seal bodies 58*a*, 58*b* can be made from graphite-infused polytetrafluoroethylene (PTFE). Apertures 74*a* extend into seal body 58*a* and are aligned with flowpath 70*a*. Apertures 74*a* provide openings for the first component material to flow into and out of passage 72*a* in valve head 66*a*. Apertures 74*b* extend into seal body 58*b* and are aligned with flowpath 70*b*. Apertures 74*b* provide openings for the second component material to flow into and out of passage 72*b* in valve head 66*b*.

Valve members 56*a*, 56*b* are disposed partially within seal bodies 58*a*, 58*b* and extend out of seal bodies 58*a*, 58*b* and valve bores 48*a*, 48*b*. Valve heads 66*a*, 66*b* are disposed within seal bodies 58*a*, 58*b* and are configured to seal against the inner surfaces of seal bodies 58*a*, 58*b*. In some examples, valve heads 66*a*, 66*b* can be formed from a metal. Passages 72*a*, 72*b* extend through valve heads 66*a*, 66*b*, respectively, and are configured to provide flowpaths for the materials to flow downstream through valves 36*a*, 36*b* when valves 36*a*, 36*b* are in the open state. In the example shown, passages 72*a*, 72*b* extend through opposite sides of valve heads 66*a*, 66*b* such that the inlets and outlets of passages 72*a*, 72*b* are disposed about 180-degrees apart around valve heads 66*a*, 66*b*. Passages 72*a*, 72*b* can thereby be straight passages through valve heads 66*a*, 66*b*. It is understood, however, that passages 72*a*, 72*b* can be of any desired configuration suitable for controlling material flow between portions of flowpaths 70a, 70b upstream of valves 36a, 36b and portions of flowpaths 70a, 70b downstream of valves 36a, 36b.

As shown, valve heads 66a, 66b are tapered such that the ends extending furthest into valve bores 48a, 48b are wider than the opposite ends of valve heads 66a, 66b. The bores through seal bodies 58a, 58b include corresponding profiles to the tapering of valve heads 66a, 66b, thereby enhancing the seal between valve heads 66a, 66b and seal bodies 58a, 58b. While valve heads 66a, 66b and seal bodies 58a, 58b are shown as tapering inwards towards valve stems 68a, 68b, it is understood that valve heads 66a, 66b and seal bodies 58a, 58b can have any desired corresponding profiles. For example, valve heads 66a, 66b and seal bodies 58a, 58b can taper outwards towards valve stems 68a, 68b or valve heads 66a, 66b can be globular, among other options.

The tapered interface shown between valve heads 66a, 66b and seal bodies 58a, 58b promotes enhanced sealing. The compressive force exerted by packing nuts 64a, 64b drives seal bodies 58a, 58b further into valve bores 48a, 48b, thereby tightening the engagement between seal bodies 58a, 58b and valve heads 66a, 66b. As such, the tapered interface inhibits leakage. In addition, the tapered interface facilitates installation and removal of valves 36a, 36b. During installation, valve members 56a, 56b are passed through seal bodies 58a, 58b until valve heads 66a, 66b are disposed within and engage seal bodies 58a, 58b. The assembled valve members 56a, 56b and seal bodies 58a, 58b can then be inserted into valve bores 48a, 48b. During removal, valve members 56a, 56b can be pulled out of valve bores 48a, 48b, and valve members 56a, 56b can carry seal bodies 58a, 58b out of valve bores 48a, 48b due to the engagement at the tapered interface.

Valve stems 68a, 68b extend from valve heads 66a, 66b, respectively. Valve stems 68a, 68b extend out of valve bores 48a, 48b through outer spacers 62a, 62b and packing nuts 64a, 64b. Valve stems 68a, 68b extend into and through mounting blocks 34a, 34b. Interfacing flats on the exterior of valve stems 68a, 68b and the interior of mounting blocks 34a, 34b prevent rotation of valve stems 68a, 68b relative to mounting blocks 34a, 34b. Primary handle 30 is attached to mounting blocks 34a, 34b, such as by fasteners extending through primary handle 30 and into mounting blocks 34a, 34b. Legs 52a, 52b of primary handle 30 can extend about distal portions of stems 68a, 68b, respectively. Rotating primary handle 30 causes rotation of both mounting blocks 34a, 34b and valve members 56a, 56b.

Outer spacers 62a, 62b are disposed in valve bores 48a, 48b on an opposite side of seal bodies 58a, 58b from inner spacers 60a, 60b. In the example shown, outer spacers 62a, 62b and inner spacers 60a, 60b are each formed from one or more sealing rings. While outer spacers 62a, 62b are shown as including three sealing rings each, it is understood that outer spacers 62a, 62b can include as many or as few sealing rings as necessary to seal valve bores 48a, 48b. Packing nuts 64a, 64b can be mounted within valve bores 48a, 48b in any desired manner, such as by interfaced threading. Packing nuts 64a, 64b are mounted in valve bores 48a, 48b and are configured to compress the sealing elements of valves 36a, 36b within valve bores 48a, 48b to facilitate the seal within valve bores 48a, 48b. Packing nuts 64a, 64b can compress inner seals 60a, 60b; outer seals 62a, 62b; seal bodies 58a, 58b; and valve members 56a, 56b together to facilitate sealing within valve bores 48a, 48b.

During operation, valve members 56a, 56b are configured to be rotated between the open state (shown in FIG. 3) and a closed state. Primary handle 30 links valve members 56a, 56b for simultaneous actuation. Operation of valve 36a will be discussed in detail as an exemplar, and it is understood that valve 36b operates in substantially the same manner as valve 36a. With valve member 56a in the open state, passage 72a is aligned with apertures 74a in seal body 58a. A flowpath is thereby opened through valve 36a and the component material flows through passage 72a and downstream through flowpath 70a to check valve 38a. The component material causes check valve 38a to open and the component material flows out of flowpath 70a at mixer 40.

Primary handle 30 can be rotated to shift valve member 56a to the closed state. In the closed state, passage 72a is fluidly disconnected from apertures 74a such that the component material is prevented from flowing downstream through valve 36a. The portion of flowpath 70a downstream of valve 36a is thereby fluidly isolated from the portion of flowpath 70a upstream of valve 36a. Valve member 56a rotates about 90-degrees between the open state and the closed state. It is understood, however, that other degrees of rotation are possible so long as passage 72a is fluidly connected to apertures 74a in the open state and fluidly disconnected from apertures 74a in the closed state.

With valves 36a, 36b in the respective closed states, the flushing process can then be commenced. During flushing, solvent flows into flowpaths 70a, 70b at intersections 80a, 80b. Valves 36a, 36b prevent the solvent from flowing to the portions of flowpaths 70a, 70b upstream of valves 36a, 36b. The solvent flows through check valves 38a, 38b and mixer 40 and downstream to the dispensing point. The solvent thereby flushes any component material or mixed material from the portions of flowpaths 70a, 70b downstream of valves 36a, 36b, from within mixer 40, and from any flowpaths between mix manifold 16 and the dispense point.

Mix manifold 16 provides significant advantages. Check valves 38a, 38b are disposed downstream of valves 36a, 36b and prevent any backflow of either component material or mixed material to the portions of flowpaths 70a, 70b upstream of check valves 38a, 38b. The mixed material is thereby prevented from backflowing into valves 36a, 36b, which can be particularly difficult to flush with solvent. In addition, the tapered interface between valve heads 66a, 66b and seal bodies 58a, 58b promotes enhanced sealing and eases installation and removal of valves 36a, 36b. Linking valve members 56a, 56b via primary handle 30 ensures that both valves 36a, 36b are in the same state (e.g., the open state or the closed state). In addition, rotating valve members 56a, 56b between the respective states reduces wear on seal bodies 58a, 58b and valve members 56a, 56b.

Figure 4A:
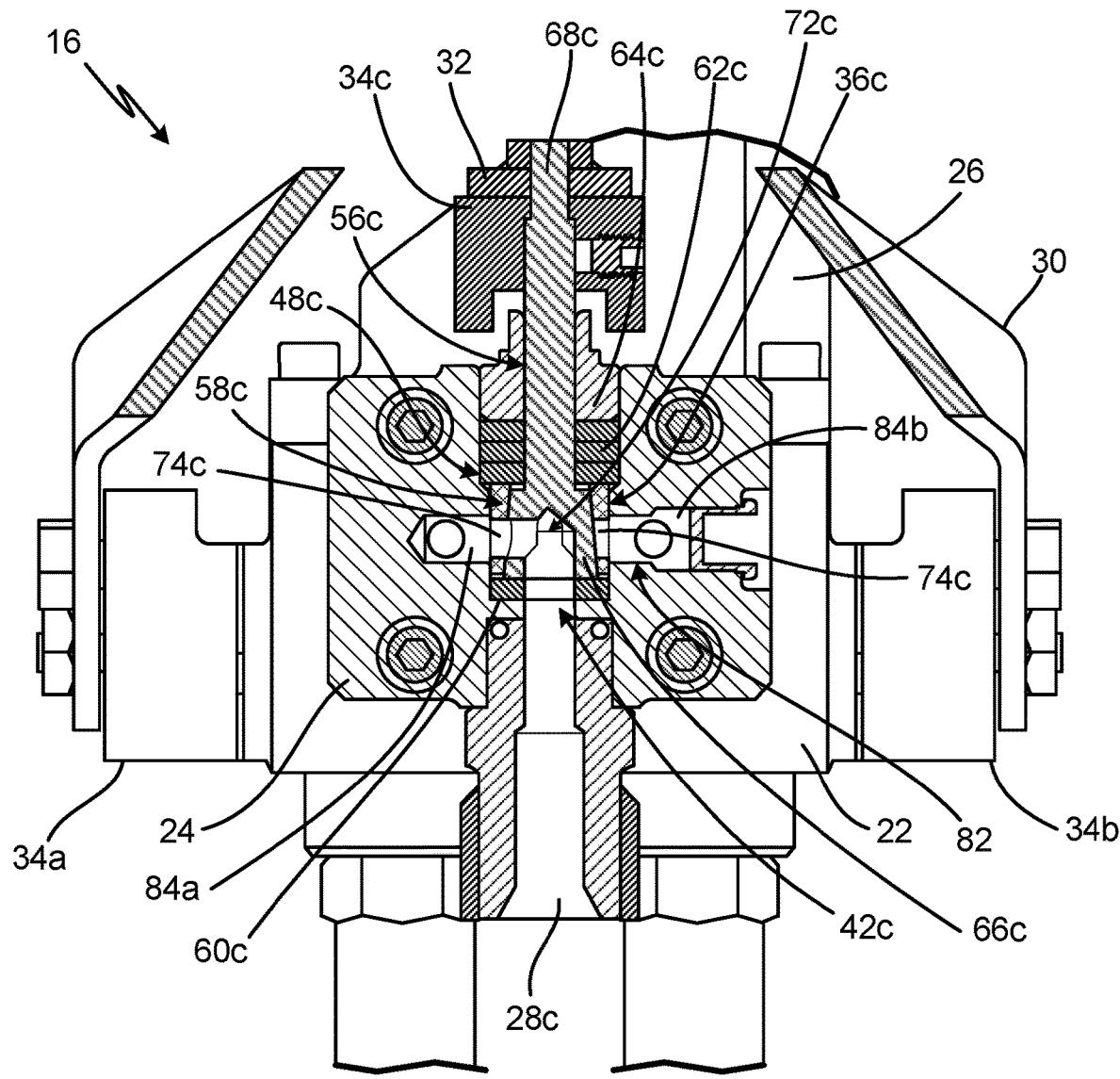
FIG. 4A is a cross-sectional view of the mix manifold shown in FIG. 2A taken along line A-A in FIG. 2A.
Figure 4B:
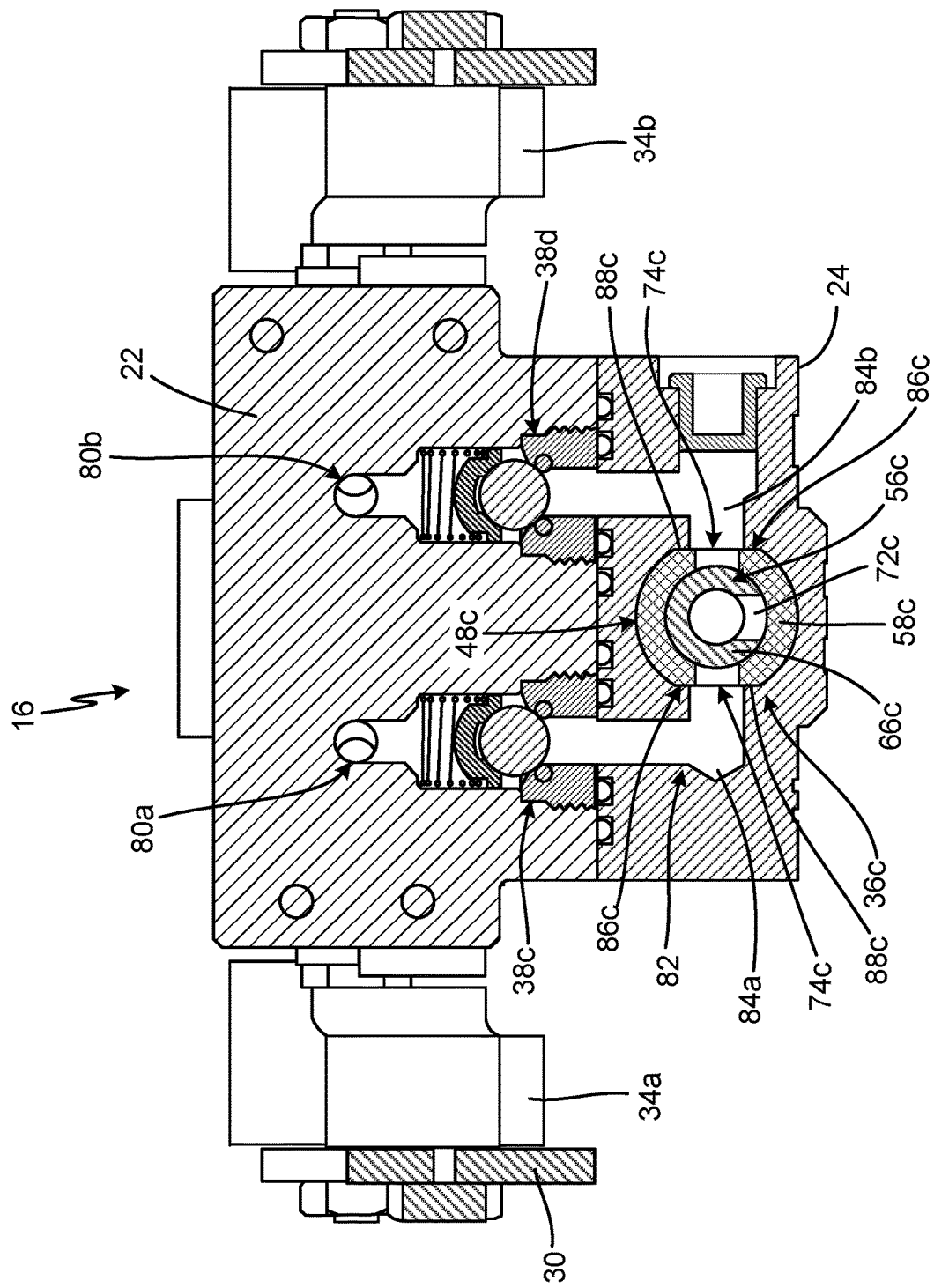
FIG. 4B is a cross-sectional view of the mix manifold shown in FIG. 2A taken along line B-B in FIG. 2A.

FIG. 4A is a cross-sectional view of mix manifold 16 taken along line A-A in FIG. 2A. FIG. 4B is a cross-sectional view of mix manifold 16 taken along line B-B in FIG. 2A. Main housing 22; solvent housing 24; mix housing 26; inlet connector 28c; primary handle 30; solvent handle 32; mounting blocks 34a, 34b, 34c; valve 36c; and check valves 38c, 38d of mix manifold 16 are shown. Solvent housing 24 includes material inlet 42c, valve bore 48c, and solvent flowpath 82. Solvent flowpath 82 includes branch paths 84a, 84b. Valve 36c includes valve member 56c, seal body 58c, inner spacer 60c, outer spacer 62c, and packing nut 64c. Valve member 56c includes valve head 66c and valve stem 68c. Valve head 66c includes passage 72c. Seal body 58c includes apertures 74c and outer flats 86c. Valve bore 48c includes inner flats 88c.

Solvent flowpath 82 extends through solvent housing 24 between material inlet 42c and main housing 22. Solvent flowpath 82 further extends through main housing 22 to intersections 80a, 80b. Valve bore 48c extends into solvent housing 24 and intersects with solvent flowpath 82. Branch paths 84a, 84b form portions of solvent flowpath 82 extending downstream from valve bore 48c. Branch paths 84a, 84b extend to intersections 80a, 80b, respectively. Intersections 80a, 80b are disposed at the connection between branch paths 84a, 84b and flowpaths 70a, 70b (best seen in FIG. 3). Branch paths 84a, 84b are respectively configured to provide solvent to flowpaths 70a, 70b at intersections 80a, 80b.

Check valves 38c, 38d are disposed in branch paths 84a, 84b, respectively, at the interface of solvent housing 24 and main housing 22. As such, check valves 38c, 38d prevent the component material from flowing into branch paths 84a, 84b from flowpaths 70a, 70b. Check valves 38c, 38d further prevent backflow of solvent into branch paths 84a, 84b during flushing. Check valves 38c, 38d thereby isolate valve 36c from potential contamination from either the component materials or the mixed material.

Valve 36c is disposed in valve bore 48c and is configured to control flow of the component materials downstream through branch paths 84a, 84b. Seal body 58c can be installed with either outer flat 86c interfacing with either inner flat 88c. Outer flats 86c correspond with inner flats 88c to ensure that seal body 58c is properly aligned in valve bore 48c during installation.

Inner spacer 60c is disposed within valve bore 48c between the bottom of valve bore 48c and valve member 56c. An opening extends through inner spacer 60c to provide a flowpath for solvent to enter passage 72c of valve member 56c through inner spacer 60c. Seal body 58c is disposed in valve bore 48c. Seal body 58c is configured to seal against solvent housing 24 within valve bore 48c. In some examples, seal body 58c can be made from graphite-infused PTFE.

Valve member 56c is disposed partially within seal body 58c and extends out of seal body 58c and valve bore 48c. Valve head 66c is disposed within seal body 58c and is configured to seal against the inner surface of seal body 58c. In some examples, valve head 66c can be formed from a metal. Passage 72c extends through valve head 66c and is configured to provide a flowpath for the materials to flow downstream through valve 36c to one of branch paths 84a, 84b. As shown, passage 72c includes a 90-degree bend to route solvent from material inlet 42c to one of branch paths 84a, 84b. It is understood, however, that passage 72c can be of any desired configuration for selectively routing solvent from material inlet 42c to one or the other or neither of branch paths 84a, 84b.

As shown, valve head 66c is tapered such that the ends extending furthest into valve bore 48c is wider than the opposite ends of valve head 66c. The bores through seal body 58c includes a corresponding profile to the tapering of valve head 66c, thereby enhancing the seal between valve head 66c and seal body 58c. While valve head 66c and seal body 58c are shown as tapering inwards towards valve stem 68c, it is understood that valve head 66c and seal body 58c can have any desired corresponding profiles. For example, valve head 66c and seal body 58c could taper outwards towards valve stem 68c or valve head 66c could be globular, among other options.

The tapered interface shown between valve head 66c and seal body 58c promotes enhanced sealing. The compressive force exerted by packing nut 64c drives seal body 58c further into valve bore 48c, thereby tightening the engagement between seal body 58c and valve head 66c. The fluid pressure of the solvent upstream of valve 36c further enhances the seal between valve member 56c and seal body 58c. The upstream pressure pushes upward on valve member 56c, thereby tightening the engagement at the interface between valve head 66c and seal body 58c. As such, the tapered interface inhibits leakage. In addition, the tapered interface facilitates installation and removal of valve 36c.

Valve stem 68c extends from valve head 66c and out of valve bore 48c through outer spacer 62c and packing nut 64c. Valve stem 68c extends into and through mounting block 34c. Interfacing flats on the exterior of valve stem 68c and the interior of mounting block 34c prevent rotation of valve stem 68c relative to mounting block 34c. A nut can be threaded onto the end of valve stem 68c to secure valve stem 68c to mounting block 34c. A set screw can be threaded into mounting block 34c to secure valve stem 68c to mounting block 34c. Solvent handle 32 is attached to mounting block 34c, such as by fasteners extending through solvent handle 32 and into mounting block 34c. Solvent handle 32 can extend about a distal portion of valve stem 68c. Rotating solvent handle 32 causes rotation of both mounting block 34c and valve member 56c.

Outer spacer 62c is disposed in valve bore 48c on an opposite side of seal body 58c from inner spacer 60c. Packing nut 64c is mounted in valve bore 48c and is configured to compress the sealing elements of valve 36c within valve bore 48c. Packing nut 64c can be mounted within valve bore 48c in any desired manner, such as by interfaced threading.

Valve 36c is a three-way valve that is movable between a first flow position, a second flow position, and a shut-off position. Valve 36c is configured to direct the flow of solvent to one or the other of branch paths 84a, 84b. During operation, primary handle 30 is shifted to place each of valves 36a, 36b (best seen in FIG. 3) into the closed state. With valves 36a, 36b in the closed state, primary handle 30 is in a position such that primary handle 30 does not interfere with actuation of solvent handle 32. As such, solvent handle 32 can be actuated between three positions to control the position of valve member 56c thus the flow of solvent. In some examples, valve member 56c can rotate about 90-degrees between each position. In some examples, valve member 56c can rotate about 180-degrees between the furthest extents of rotation. For example, valve member 56c can rotate about 180-degrees between the first flow position and the second flow position.

Valve member 56c is connected to solvent handle 32 such that solvent handle 32 can rotate valve member 56c between the first flow position, the second flow position, and the shut-off position. In the first flow position, valve member 56c is positioned such that passage 72c fluidly connects material inlet 42c and branch path 84a. With valve member 56c in the first flow position, the solvent can flow downstream through branch path 84a, through check valve 38c, and into flowpath 70a at intersection 80a. The solvent can thereby flush material from flowpath 70a.

To flush second branch path 84b, solvent handle 32 is rotated to place valve member 56c in the second flow position. In the second flow position, valve member 56c is positioned such that passage 72c fluidly connects material inlet 42c and branch path 84b. With valve member 56c in the second flow position the solvent can flow downstream through branch path 84b, through check valve 38d, and into flowpath 70b at intersection 80b. The solvent can thereby flush material from flowpath 70b.

After flushing, solvent handle 32 can be returned to a neutral position, thereby placing valve member 56c in the shut-off position (shown in FIGS. 4A and 4B). In the shut-off position, the outlet of passage 72c is oriented towards the wall forming the bore through seal body 58c. The seal between valve head 66c and seal body 58c prevents the solvent from flowing to either branch path 84a, 84b with valve member 56c in the shut-off position.

In the first flow position, valve member 56c directs solvent to branch path 84a and prevents solvent from flowing to branch path 84b. In the second flow position, valve 36c directs solvent to branch path 84b and prevents solvent from flowing to branch path 84a. In the shut-off position, valve 36c prevents solvent from flowing to either branch path 84a, 84b. As such, valve 36c facilitates selective flushing of one component side at a time. The user can thereby separately flush material from flowpath 70a and from flowpath 70b. Separately flushing each flowpath 70a, 70b ensures that the flowpaths 70a, 70b are fully flushed.

Mix manifold 16 provides significant advantages. Check valves 38c, 38d are disposed downstream of valve 36c and prevent flow of either component material or mixed material to branch paths 84a, 84b. The tapered interface between valve head 66c and seal body 58c promotes enhanced sealing and eases installation and removal of valve 36c. Moreover, the upstream solvent pressure enhances the seal between valve head 66c and seal body 58c due to the tapering. Valve 36c facilitates separately flushing flowpaths 70a, 70b, which ensures that each flowpath 70a, 70b is fully flushed of material. Simultaneously flowing solvent to flowpaths 70a, 70b can inhibit flushing of one or the other of flowpaths 70a, 70b due to disparate viscosities or a buildup of material in one or the other of flowpaths 70a, 70b.

Figure 5:
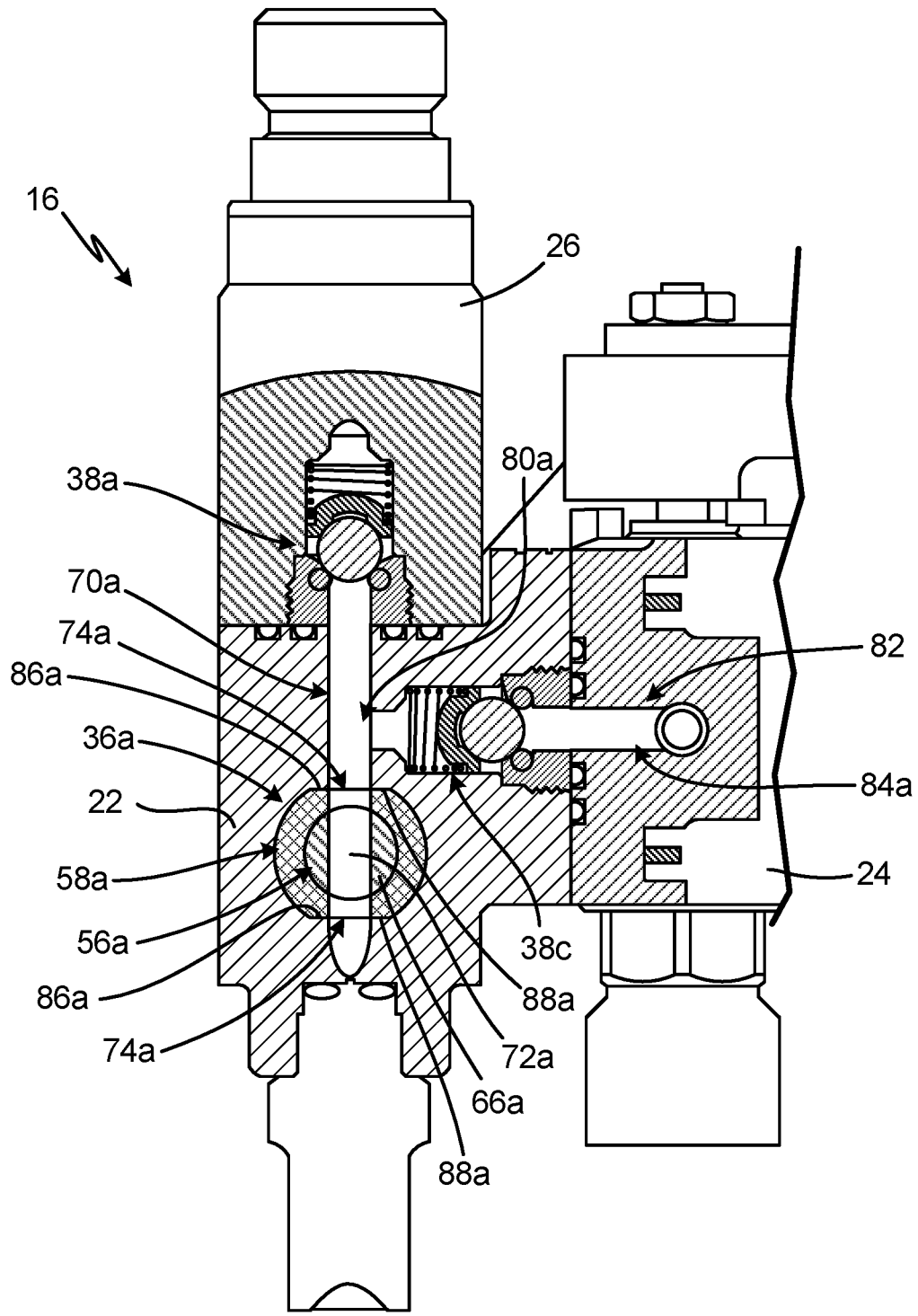
FIG. 5 is a cross-sectional view of the mix manifold shown in FIG. 2A taken along line 5-5 in FIG. 2A.

FIG. 5 is a cross-sectional view of mix manifold 16 taken along line 5-5 in FIG. 2A. Main housing 22; solvent housing 24; mix housing 26; valve 36a; and check valves 38a, 38c of mix manifold 16 are shown. Flowpath 70a, a portion of branch path 84a of solvent flowpath 82, and intersection 80a are shown. Valve member 56a and seal body 58a of valve 36a are shown. Valve head 66a and passage 72a of valve member 56a are shown. Seal body 58a includes apertures 74a and outer flats 86a. Valve bore 48a includes inner flats 88a.

Seal body 58a is disposed in valve bore 48a. Each of seal body 58a, seal body 58b (best seen in FIG. 3), and seal body 58c (best seen in FIGS. 4A and 4B) can be identical. Seal body 58a is disposed in valve bore 48a. Seal body 58a can be installed with either outer flat 86a interfacing with either inner flat 88a. Outer flats 86a correspond with inner flats 88a to ensure that seal body 58a is properly aligned in valve bore 48a during installation.

Valve 36a is shown in the open state in FIG. 5. Valve 36a is in the open state during application of the plural component material. As such, passage 72a provides a flowpath for the component material to flow through valve 36a between apertures 74a in seal body 58a. The component material can flow downstream through check valve 38a to mixer 40 (best seen in FIG. 3). Check valve 38c prevents the component material from flowing into branch path 84a. After application, valve member 56a is rotated to the closed state, where passage 72a is fluidly disconnected from body apertures 74a. Valve 36a thereby prevents the component material from flowing downstream through valve 36a.

To begin flushing flowpath 70a, valve 36c (best seen in FIGS. 4A and 4B) is rotated to the first flow position to direct solvent to branch path 84a. The solvent flows through branch path 84a and through check valve 38c to intersection 80a. The solvent enters flowpath 70a at intersection and can flow both upstream to valve 36a and downstream through check valve 38a. Valve 36a prevents the solvent from flowing upstream beyond valve 36a. As such, the solvent flushes all parts of flowpath 70a disposed downstream of valve 36a. The solvent flows downstream through check valve 38a to mixer 40 and other components disposed downstream of flowpath 70a.

Figure 6:
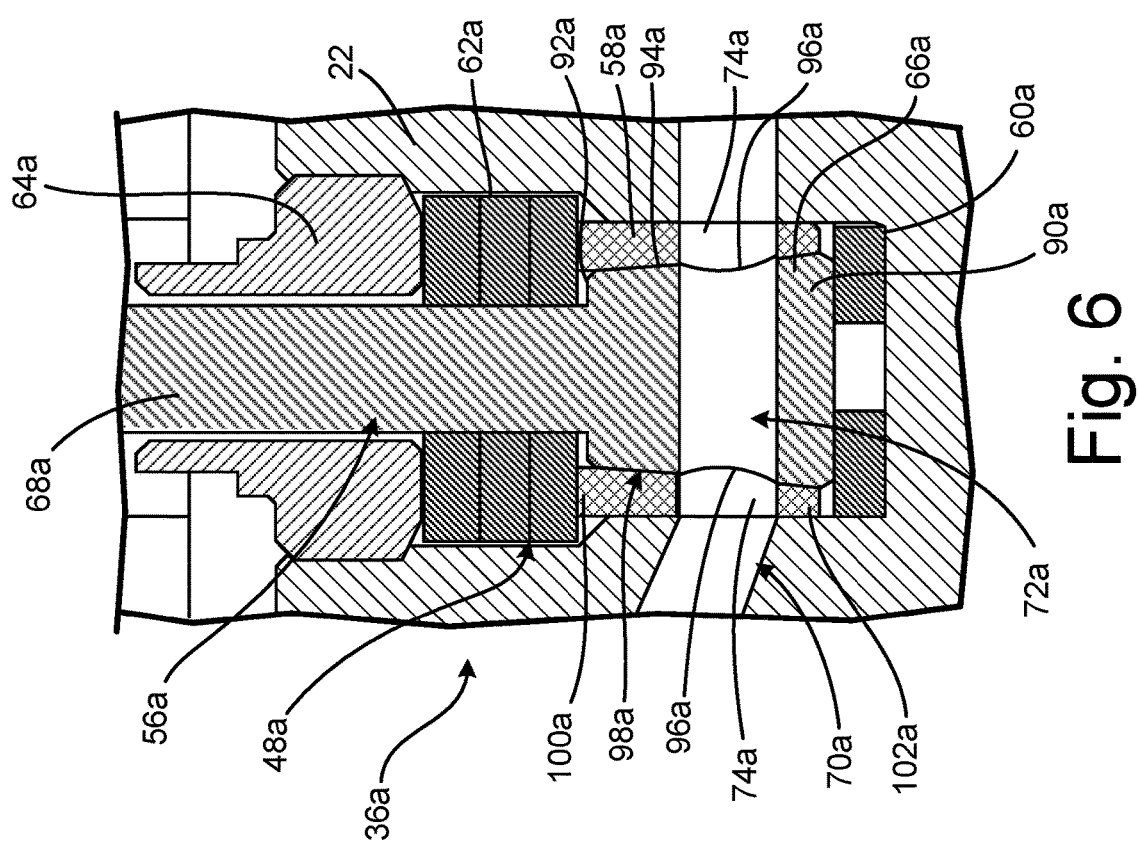
FIG. 6 is an enlarged cross-sectional view of a material valve.

FIG. 6 is an enlarged cross-sectional view of a portion of valve 36a. A portion of main housing 22 is shown. Valve bore 48a and a portion of flowpath 70a are shown. Valve 36a includes valve member 56a, seal body 58a, inner spacer 60a, outer spacer 62a, and packing nut 64a. Valve member 56a includes valve head 66a and stem 68a. Valve head 66a includes passage 72a, first end 90a, second end 92a, and exterior surface 94a. Passage 72a includes orifices 96a. Seal body 58a includes apertures 74a, bore 98a, first end 100a, and second end 102a.

Valve bore 48a extends into main housing 22 and intersects flowpath 70a. Valve 36a is mounted within valve bore 48a. Inner spacer 60a is disposed within valve bore 48a between first end 90a of valve head 66a and main housing 22. Seal body 58a is disposed in valve bore 48a. Seal body 58a is configured to seal against main housing 22. Body apertures 74a extend through seal body 58a to bore 98a. Body apertures 74a are aligned with the passages forming flowpath 70a. In some examples, seal body 58a can be formed from a sealing material. For example, seal body 58a can be formed from graphite-infused PTFE.

Valve head 66a is disposed in bore 98a and extends through seal body 58a. Stem 68a extends from second end 92 of valve head 66a out of first end 100 of seal body 58a and projects out of valve bore 48a. Stem 68a extends through the sealing rings forming second spacer 62a and packing nut 64a. First end 90a of valve head 66a extends out of bore 98a beyond second end 102a of seal body 58a. First end 90a can contact and seal against inner spacer 60a. Exterior surface 94a extends between first end 90a and second end 92a of valve head 66a. Exterior surface 94a is configured to bear against and seal with the wall forming bore 98a of seal body 58a. Orifices 96a extend through exterior surface 94a and provides openings for material to enter and exit passage 72a. Passage 72a extends through valve head 66a between orifices 96a.

Exterior surface 94a is tapered between first end 90a and second end 92a. As such, valve head 66a can be frustoconical. In the example shown second end 92a has a smaller diameter than first end 90a such that valve head 66a decreases in diameter between first end 90a and second end 92a. Bore 98a is similarly tapered between second end 102a and first end 100a to mate with the tapered exterior surface 94a of valve head 66a.

Second spacer 62a is disposed in valve bore 48a and abuts first end 100a of seal body 58a. In the example shown, second spacer 62a is formed from a plurality of seal rings, whereas inner spacer 60a is formed from a single seal ring. The rings forming inner spacer 60a and second spacer 62a can be identical. While second spacer 62a is shown as formed from multiple sealing rings, it is understood that second spacer 62a can be of any suitable configuration for sealing within valve bore 48a. Packing nut 64a connects to main housing 22 and secures other components of valve 36a within valve bore 48a. Packing nut 64a can be secured within valve bore 48a in any desired manner, such as by interfaced threading. During installation packing nut 64a is torqued to compress second spacer 62a, seal body 58a, valve member 56a, and inner spacer 60a within valve bore 48a. Compressing the elements of valve 36a facilitates the seals between seal body 58a and main housing 22a and between valve head 66a and seal body 58a.

During operation, valve 36a is placed in the open state shown in FIG. 6 during application of the plural component material. In the open state, orifices 96a are aligned with apertures 74a such that passage 72a provides a flowpath between portions of flowpath 70a disposed on the upstream and downstream sides of valve 36a. Valve member 56a can be rotated closed state where passage 72a is fluidly disconnected from flowpath 70a. In the closed state, valve 36a prevents material from flowing between portions of flowpath 70a disposed on the upstream and downstream sides of valve 36a.

Valve 36a provides significant advantages. The tapered interface between valve head 66a and seal body 58a provides enhanced sealing. The compressive force exerted by packing nut 64a tightens the engagement of valve head 66a in bore 98a due to the tapered interface. As such, the tapered interface inhibits leakage. In addition, the tapered interface facilitates installation and removal of valve 36a. During installation, valve member 56a is passed through seal body 58a until valve head 66a is disposed within and engages seal body 58a. The assembled valve member 56a and seal body 58a can be inserted into valve bore 48a. During removal, valve member 56a can be pulled out of valve bore 48a. Valve member 56a can pull seal body 58a out of valve bore 48a due to the engagement at the tapered interface.

Figure 7:
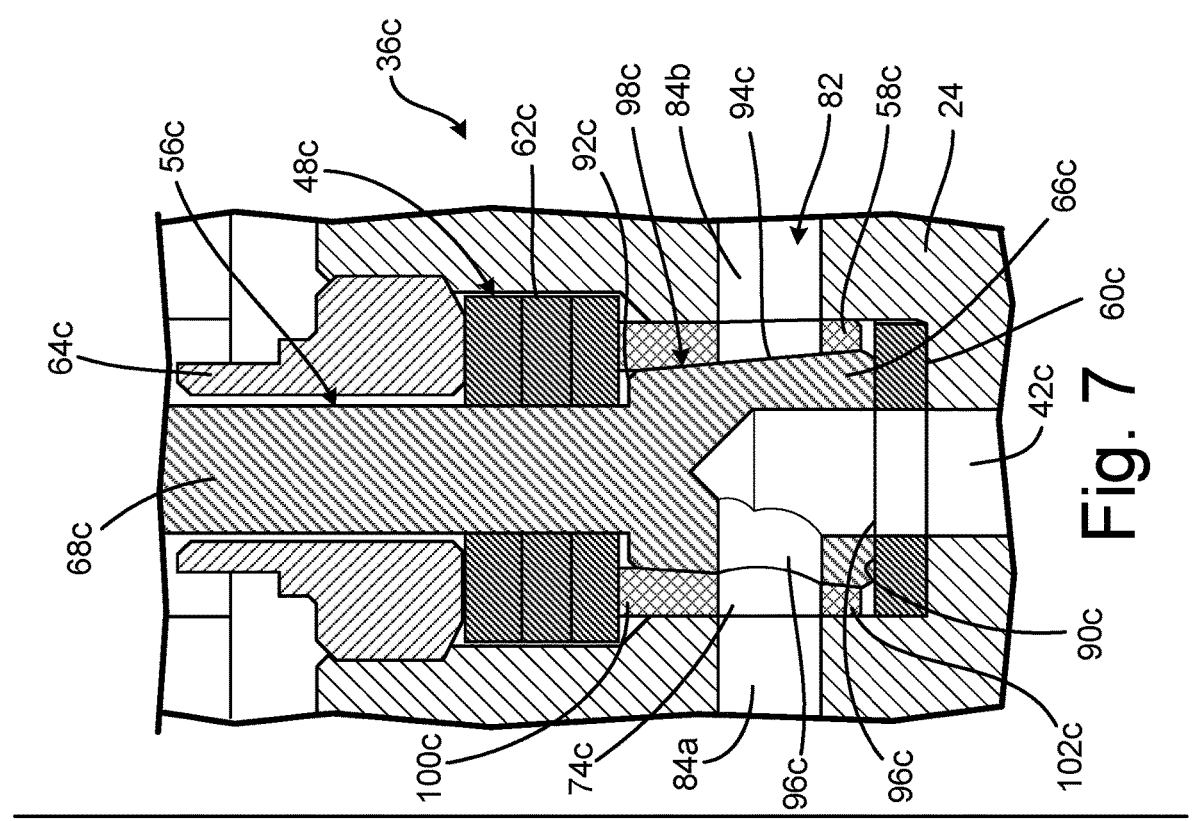
FIG. 7 is an enlarged cross-sectional view of a solvent valve.

FIG. 7 is an enlarged cross-sectional view of a portion of solvent valve 36c. A portion of solvent housing 24 is shown. Valve bore 48c and a portion of solvent flowpath 82 are shown. Valve 36c includes valve member 56c, seal body 58c, inner spacer 60c, outer spacer 62c, and packing nut 64c. Valve member 56c includes valve head 66c and stem 68c. Valve head 66c includes passage 72c, first end 90c, second end 92c, and exterior surface 94c. Passage 72c includes orifices 96c. Seal body 58c includes apertures 74c, bore 98c, first end 100c, and second end 102c.

Valve bore 48c extends into solvent housing 24 and intersects solvent flowpath 82. Branch paths 84a, 84b extend from valve bore 48c. Valve 36c is mounted within valve bore 48c. Inner spacer 60c is disposed within valve bore 48c between first end 90c of valve head 66c and main housing 22. Seal body 58c is disposed in valve bore 48c. Seal body 58c is configured to seal against main housing 22. Apertures 74c extend through seal body 58c to bore 98c. Apertures 74c are aligned with the passages forming branch paths 84a, 84b. In some examples, seal body 58c can be formed from a sealing material. For example, seal body 58c can be formed from graphite-infused PTFE.

Valve head 66c is disposed in bore 98c and extends through seal body 58c. Stem 68c extends from second end 92 of valve head 66c out of first end 100 of seal body 58c and projects out of valve bore 48c. Stem 68c extends through the sealing rings forming outer spacer 62c and extends through packing nut 64c. First end 90c of valve head 66c extends out of bore 98c beyond second end 102c of seal body 58c. First end 90c can contact and seal against inner spacer 60c. Inner spacer 60c can provide a bearing surface for valve head 66c to bear against during rotation.

Exterior surface 94c extends between first end 90c and second end 92c of valve head 66c. Exterior surface 94c is configured to bear against and seal with the wall forming bore 98c of seal body 58c. Exterior surface 94c is tapered between first end 90c and second end 92c. As such, valve head 66c can be frustoconical. In the example shown second end 92c has a smaller diameter than first end 90c such that valve head 66c decreases in diameter between first end 90c and second end 92c. Bore 98c is similarly tapered between second end 102c and first end 100c to mate with the tapered exterior surface 94c of valve head 66c.

A first orifice 96c extends through first end 90c of valve head 66c and provides an opening for material to enter passage 72c from material inlet 42c. As such, orifice 96c through valve head 66c can be the inlet orifice of passage 72c. The material flows from material inlet 42c, through the central opening in inner spacer 60c, and enters passage 72c through the inlet orifice 96c. A second orifice 96c extends through exterior surface 94c and provides an opening for material to exit passage 72c. As such, orifice 96c through exterior surface 94c can be the outlet orifice of passage 72c. Passage 72c extends through valve head 66c between orifices 96c. In the example shown, passage 72c includes a bend between the inlet orifice 96c and the outlet orifice 96c. The orientations of orifices 96c and passage 72c facilitates valve 36c being a three-way valve actuatable between three distinct flow control positions. In the example shown, the bend in passage 72c is about 90-degrees. It is understood, however, that the bend can be of any desired configuration for redirecting flow from material inlet 42c to branch paths 84a, 84b.

Outer spacer 62c is disposed in valve bore 48c and abuts first end 100c of seal body 58c. In the example shown, outer spacer 62c is formed from a plurality of seal rings, whereas inner spacer 60c is formed from a single seal ring. The rings forming inner spacer 60c and outer spacer 62c can be identical. While outer spacer 62c is shown as formed from multiple sealing rings, it is understood that outer spacer 62c can be of any suitable configuration for sealing within valve bore 48c. Packing nut 64c connects to solvent housing 24 and secures other components of valve 36c within valve bore 48c. Packing nut 64c can be secured within valve bore 48c in any desired manner, such as by interfaced threading. During installation packing nut 64c is torqued to compress outer spacer 62c, seal body 58c, valve member 56c, and inner spacer 60c within valve bore 48c. Compressing the elements of valve 36c facilitates the seals between seal body 58c and main housing 22c and between valve head 66c and seal body 58c.

During operation, valve 36c is movable between a first flow position, a second flow position, and a shut-off position. With valve member 56c in the first flow position (shown in FIG. 7), valve member 56c directs the solvent to branch path 84a. The solvent flows through branch path 84a to flowpath 70a (best seen in FIG. 3) to flush flowpath 70a. Valve member 56c is rotated about 180-degrees from the first flow position to the second flow position. In the second flow position, valve member 56c directs the solvent to branch path 84b to flush flowpath 70b (best seen in FIG. 3). Valve member 56c is rotated about 90-degrees from either the first flow position or the second flow position to the shut-off position. In fact, valve member 56c is in the shut-off position as valve member 56c rotates from one to the other of the first flow position and the second flow position. In the shut-off position, the outlet orifice 96c extending through exterior surface 94c is aligned with the wall forming valve bore 98c of seal body 58c, thereby sealing the flowpath through passage 72c and preventing solvent from flowing to either branch path 84a, 84b.

The upstream solvent pressure acts on valve 36c with valve 36c in the shut-off position. The upstream solvent pressure enhances sealing between valve member 56c and seal body 58c, as the upward pressure exerted on valve member 56c tightens the tapered interface between valve head 66c and seal body 58c.

Valve 36c provides significant advantages. The tapered interface between valve head 66c and seal body 58c provides enhanced sealing. The compressive force exerted by packing nut 64*c* tightens the engagement between bore 98*c* and valve head 66*c* due to the tapered interface. As such, the tapered interface inhibits leakage. The tapered interface further facilitates sealing as the upstream solvent pressure pushes valve head 66*c* into tighter engagement with seal body 58*c*. In addition, the tapered interface facilitates installation and removal of valve 36*c*. During installation, valve member 56*c* is passed through seal body 58*c* until valve head 66*c* is disposed within and engages seal body 58*c*. The assembled valve member 56*c* and seal body 58*c* can be inserted into bore 98*c*. During removal, valve member 56*c* can be pulled out of bore 98*c*. Valve member 56*c* can pull seal body 58*c* out of valve bore 48*c* as valve member 56*c* is pulled from valve bore 48*c*, due to the engagement at the tapered interface.

FIG. 8A is an isometric view of valve member 56. FIG. 8B is a side elevational view of valve member 56. FIG. 8C is a cross-sectional view of valve member 56 taken along line C-C in FIG. 8B. FIGS. 8A-8C will be discussed together. Valve member 56 includes valve head 66 and stem 68. Valve head 66 includes passage 72, first end 90, second end 92, exterior surface 94, and orifices 96. Each orifice 96 includes chamfered edge 104. Stem 68 includes first portion 106 and second portion 108. First portion 106 includes stem flats 110. Second portion 108 includes threading 112.

Valve member 56 is identical to valve member 56*a* (best seen in FIG. 2B) and valve member 56*b* (best seen in FIG. 2B). Valve member 56 is similar to valve member 56*c* (best seen in FIG. 2B), except valve member 56*c* includes an inlet orifice 96*c* (FIG. 7) through the first end 90*c* (FIG. 7) of valve head 66*c* (FIG. 7), whereas valve member 56 includes both inlet and outlet orifices 96 through exterior surface. Valve member 56 is configured to rotate about axis A-A between various positions. In some examples, valve member 56 is metallic.

Passage 72 extends through valve head 66 and is configured to provide a flowpath for material to flow through valve head 66. Exterior surface 94 extends between first end 90 and second end 92 of valve head 66. Orifices 96 extend through exterior surface 94 and provide the inlet and outlet for passage 72. Each orifice 96 includes chamfered edge 104 extending annularly about each orifice 96. Chamfered edge 104 prevents gouging and shaving of any sealing material as valve member 56 rotates during use. While orifices 96 are shown as generally circular, it is understood that orifices 96 can be of any desired configuration, such as cat-eye shaped.

First end 90 of valve head 66 has first diameter D1 and second end 92 of valve head 66 has second diameter D2. In the example shown, first diameter D1 is larger than second diameter D2 such that exterior surface 94 is tapered between first end 90 and second end 92. It is understood, however, that valve head 66 can be of any configuration suitable for sealing with and rotating relative to a seal, such as seal body 58*a* (best seen in FIGS. 2B and 3), seal body 58*b* (best seen in FIGS. 2B and 3), and/or seal body 58*c* (FIG. best seen in FIGS. 2B and 4A). For example, first diameter D1 can be about the same size as second diameter D2, or first diameter D1 can be smaller than second diameter D2 such that exterior surface 94 tapers inward from second end 92 towards first end 90. In another example, valve head 66 can be globular.

Stem 68 extends from second end 92 of valve head 66. In the example shown, Second end 92 includes an annular flat surface disposed between an edge of second end 92 and stem 68. As such, stem 68 has a third diameter D3 smaller than second diameter D2. It is understood, however, that third diameter D3 can, in some examples, be about the same as second diameter D2.

First portion 106 extends from second end 92 of valve head 66 to second portion 108. First portion 106 includes stem flats 110 disposed at a distal end of first portion 106. Stem flats 110 extend longitudinally along first portion 106. Stem flats 110 are configured to engage with opposing flats in a mounting block, such as mounting blocks 34*a*, 34*b*, and 34*c* (best seen in FIG. 2A). As such, valve member 56 is secured to the mounting block for simultaneous rotation. While first portion 106 is shown as including opposed flats, it is understood that first portion 106 can be of any desired lock-and-key configuration for mating with the mounting block. For example, the distal end of first portion 106 can include more than two flats, such as three, four, five, or any other desired number of stem flats 110. The mounting block can be configured with a mating opening to receive first portion 106.

Second portion 108 projects from the distal end of first portion 106. Second portion 108 includes threading 112. Second portion 108 has a fourth diameter D4 smaller than third diameter D3. In some examples, fourth diameter D4 is about the same as the width of first portion 106 between the opposed stem flats 110. Second portion 108 is configured to project out of the mounting block that valve member 56 is attached to. Threading 112 is configured to receive a nut to secure the mounting block to valve member 56. While second portion 108 is describe as including threading 112, it is understood that second portion 108 can be of any desired configuration for receiving a stop, such as the nut, to secure the mounting block on valve member 56.

Although the present invention has been described with reference to preferred embodiments, workers skilled in the art will recognize that changes may be made in form and detail without departing from the spirit and scope of the invention.

The invention claimed is:

1. A mix manifold comprising:
a valve housing having a first fluid inlet, a second fluid inlet, a third fluid inlet, and a fluid outlet;
a first fluid flowpath extending between the first fluid inlet and the fluid outlet;
a second fluid flowpath extending between the second fluid inlet and the fluid outlet;
a third flowpath extending from the third fluid inlet, wherein the third flowpath includes a first branch extending to the first fluid flowpath and a second branch extending to the second fluid flowpath;
a first check valve disposed in the first fluid flowpath at a location downstream of an intersection between the first branch and the first fluid flowpath;
a second check valve disposed in the second fluid flowpath at a location downstream of an intersection between the second branch and the second fluid flowpath;
a first valve disposed in the first fluid flowpath and configured to control fluid flow between the first fluid inlet and the fluid outlet;
a second valve disposed in the second fluid flowpath and configured to control fluid flow between the second fluid inlet and the fluid outlet;
a third valve disposed in the third flowpath and configured to control fluid flow from the third fluid inlet to the first branch and the second branch;

a first handle extending between and linking the first valve and the second valve such that the first handle can simultaneously actuate the first valve and the second valve; and a second handle connected to the third valve and configured to actuate the third valve between a first position, a second position, and a third position;

wherein the third valve directs fluid to the first branch when in the first position, the third valve directs fluid to the second branch when in the second position, and the third valve prevents fluid from flowing to either the first branch or the second branch when in the third position.

2. The mix manifold of claim 1, wherein:

the first handle interferes with movement of the second handle to prevent the second handle from actuating the third valve out of the third position when the first valve and the second valve are open; and the second handle interferes with movement of the first handle to prevent the first handle from actuating the first valve and the second valve when the third valve is in either of the first position and the second position.

3. The mix manifold of claim 1, wherein the first valve comprises:

a first seal body disposed in a first valve bore in the valve housing, the first valve bore intersecting the first fluid flowpath; and a first valve member at least partially disposed in the first seal body, the first valve member comprising:
a first head having a first exterior surface;
a first fluid passage extending through the first head, the first fluid passage including a first orifice extending through the first exterior surface and a second orifice extending through the first exterior surface; and
a first stem extending from the first head and projecting out of the first seal body.

4. The mix manifold of claim 3, wherein the first head further comprises:

a first end; and
a second end;
wherein the first exterior surface extends between the first end and the second end and the first exterior surface is tapered between the first end and the second end; and
wherein the first stem extends from the second end.

5. The mix manifold of claim 4, wherein the first end has a first diameter and the second end has a second diameter, and wherein the first diameter is larger than the second diameter.

6. The mix manifold of claim 4, further comprising:
a first spacer disposed within the first valve bore between the first end of the first head and the valve housing; and
a second spacer disposed within the first valve bore and extending around the first stem.

7. The mix manifold of claim 6, further comprising:
a packing nut extending into the first valve bore and configured to compress the first spacer, the first seal body, and the second spacer within the first valve bore;
wherein the stem extends through the packing nut.

8. The mix manifold of claim 7, wherein the packing nut is configured to be torqued to at least 11.3 Nm.

9. The mix manifold of claim 3, wherein the first seal body is formed from polytetrafluoroethylene (PTFE) and the first valve member is formed from a metal.

10. The mix manifold of claim 3, wherein the first handle is connected to the first stem and to a second stem of the second valve to simultaneously actuate the first stem and the second stem.

11. The mix manifold of claim 3, wherein the third valve comprises:

a second seal body disposed in a second valve bore in the valve housing, the second valve bore intersecting the third flowpath; and a second valve member at least partially disposed in the second seal body, the second valve member comprising:
a second valve head having an inlet end, a stem end, and a second exterior surface extending between the inlet end and the stem end;
a second fluid passage extending through the second valve head, the second fluid passage including an inlet aperture extending through the inlet end and an outlet aperture extending through the second exterior surface; and
a second valve stem extending from the second valve head and projecting out of the second seal body;
wherein the second exterior surface is tapered between the inlet end and the stem end.

12. The mix manifold of claim 11, wherein:
the second valve member is rotatable between a first position, a second position, and a third position;
the outlet aperture is fluidly connected to the first branch with the second valve member in the first position;
the outlet aperture is fluidly connected to the second branch with the second valve member in the second position; and
the outlet aperture is fluidly disconnected from each of the first branch and the second branch with the second valve member in the third position.

13. The mix manifold of claim 3, wherein the first seal body includes at least one exterior flat, the at least one exterior flat configured to interface with at least one interior flat in the first valve bore to prevent rotation of the first seal body within the first valve bore.

14. A mix manifold comprising:
a valve housing having a first fluid inlet, a second fluid inlet, a third fluid inlet, and a fluid outlet;
a first fluid flowpath extending between the first fluid inlet and the fluid outlet;
a second fluid flowpath extending between the second fluid inlet and the fluid outlet;
a third flowpath extending from the third fluid inlet, wherein the third flowpath includes a first branch extending to the first fluid flowpath and a second branch extending to the second fluid flowpath;
a first check valve disposed in the first fluid flowpath at a location downstream of an intersection between the first branch and the first fluid flowpath;
a second check valve disposed in the second fluid flowpath at a location downstream of an intersection between the second branch and the second fluid flowpath;
a first valve disposed in the first fluid flowpath and configured to control fluid flow between the first fluid inlet and the fluid outlet, wherein the first valve comprises:
a first seal body disposed in a first valve bore in the valve housing, the first valve bore intersecting the first fluid flowpath; and
a first valve member at least partially disposed in the first seal body, the first valve member comprising:
a first head having a first end, a second end, and a first exterior surface, wherein the first exterior surface extends between the first end and the second end and the first exterior surface is tapered between the first end and the second end;
a first fluid passage extending through the first head, the first fluid passage including a first orifice extending through the first exterior surface and a second orifice extending through the first exterior surface; and
a first stem extending from the second end of the first head and projecting out of the first seal body;
a second valve disposed in the second fluid flowpath and configured to control fluid flow between the second fluid inlet and the fluid outlet; and
a third valve disposed in the third flowpath and configured to control fluid flow from the third fluid inlet to the first branch and the second branch.

15. The mix manifold of claim 14, wherein the first end has a first diameter and the second end has a second diameter, and wherein the first diameter is larger than the second diameter.

16. The mix manifold of claim 14, further comprising:
a first spacer disposed within the first valve bore between the first end of the first head and the valve housing; and
a second spacer disposed within the first valve bore and extending around the first stem.

17. A mix manifold comprising:
a valve housing having a first fluid inlet, a second fluid inlet, a third fluid inlet, and a fluid outlet;
a first fluid flowpath extending between the first fluid inlet and the fluid outlet;
a second fluid flowpath extending between the second fluid inlet and the fluid outlet;
a third flowpath extending from the third fluid inlet, wherein the third flowpath includes a first branch extending to the first fluid flowpath and a second branch extending to the second fluid flowpath;
a first check valve disposed in the first fluid flowpath at a location downstream of an intersection between the first branch and the first fluid flowpath;
a second check valve disposed in the second fluid flowpath at a location downstream of an intersection between the second branch and the second fluid flowpath;
a first valve disposed in the first fluid flowpath and configured to control fluid flow between the first fluid inlet and the fluid outlet, the first valve comprising:
a first seal body disposed in a first valve bore in the valve housing, the first valve bore intersecting the first fluid flowpath; and
a first valve member at least partially disposed in the first seal body, the first valve member comprising:
a first head having a first exterior surface;
a first fluid passage extending through the first head, the first fluid passage including a first orifice extending through the first exterior surface and a second orifice extending through the first exterior surface; and
a first stem extending from the first head and projecting out of the first seal body;
a second valve disposed in the second fluid flowpath and configured to control fluid flow between the second fluid inlet and the fluid outlet; and
a third valve disposed in the third flowpath and configured to control fluid flow from the third fluid inlet to the first branch and the second branch, wherein the third valve comprises:
a second seal body disposed in a second valve bore in the valve housing, the second valve bore intersecting the third flowpath; and
a second valve member at least partially disposed in the second seal body, the second valve member comprising:
a second valve head having an inlet end, a stem end, and a second exterior surface extending between the inlet end and the stem end;
a second fluid passage extending through the second valve head, the second fluid passage including an inlet aperture extending through the inlet end and an outlet aperture extending through the second exterior surface; and
a second valve stem extending from the second valve head and projecting out of the second seal body;
wherein the second exterior surface is tapered between the inlet end and the stem end.

18. The mix manifold of claim 17, wherein:
the second valve member is rotatable between a first position, a second position, and a third position;
the outlet aperture is fluidly connected to the first branch with the second valve member in the first position;
the outlet aperture is fluidly connected to the second branch with the second valve member in the second position; and
the outlet aperture is fluidly disconnected from each of the first branch and the second branch with the second valve member in the third position.

19. A mix manifold comprising:
a valve housing having a first fluid inlet, a second fluid inlet, a third fluid inlet, and a fluid outlet;
a first fluid flowpath extending between the first fluid inlet and the fluid outlet;
a second fluid flowpath extending between the second fluid inlet and the fluid outlet;
a third flowpath extending from the third fluid inlet, wherein the third flowpath includes a first branch extending to the first fluid flowpath and a second branch extending to the second fluid flowpath;
a first check valve disposed in the first fluid flowpath at a location downstream of an intersection between the first branch and the first fluid flowpath;
a second check valve disposed in the second fluid flowpath at a location downstream of an intersection between the second branch and the second fluid flowpath;
a first valve disposed in the first fluid flowpath and configured to control fluid flow between the first fluid inlet and the fluid outlet wherein the first valve comprises:
a first seal body disposed in a first valve bore in the valve housing, the first valve bore intersecting the first fluid flowpath, wherein the first seal body includes at least one exterior flat, the at least one exterior flat configured to interface with at least one interior flat in the first valve bore to prevent rotation of the first seal body within the first valve bore; and
a first valve member at least partially disposed in the first seal body, the first valve member comprising:
a first head having a first exterior surface;
a first fluid passage extending through the first head, the first fluid passage including a first orifice extending through the first exterior surface and a second orifice extending through the first exterior surface; and
a first stem extending from the first head and projecting out of the first seal body;

a second valve disposed in the second fluid flowpath and configured to control fluid flow between the second fluid inlet and the fluid outlet; and a third valve disposed in the third flowpath and configured to control fluid flow from the third fluid inlet to the first branch and the second branch.

* * * * *